(12) United States Patent
Hosek et al.

(10) Patent No.: US 9,752,615 B2
(45) Date of Patent: Sep. 5, 2017

(54) REDUCED-COMPLEXITY SELF-BEARING BRUSHLESS DC MOTOR

(75) Inventors: Martin Hosek, Lowell, MA (US); Jairo Terra Moura, Marlboro, MA (US); Christopher Hofmeister, Hampstead, NH (US)

(73) Assignee: Brooks Automation, Inc., Chelmsford, MA (US)

( * ) Notice: Subject to any disclaimer, the term of this patent is extended or adjusted under 35 U.S.C. 154(b) by 830 days.

(21) Appl. No.: 11/769,651

(22) Filed: Jun. 27, 2007

(65) Prior Publication Data

US 2009/0001917 A1    Jan. 1, 2009

(51) Int. Cl.
F16C 32/04    (2006.01)

(52) U.S. Cl.
CPC ...... *F16C 32/0444* (2013.01); *F16C 32/0493* (2013.01); *F16C 2380/26* (2013.01)

(58) Field of Classification Search
USPC .................................................. 318/439, 491
See application file for complete search history.

(56) References Cited

U.S. PATENT DOCUMENTS

| | | |
|---|---|---|
| 2,564,221 A | 8/1951 | Hornfeck |
| 3,205,485 A | 9/1965 | Bernard |
| 3,560,774 A | 2/1971 | Reeves |
| 3,697,992 A | 10/1972 | Kleptz |
| 3,750,151 A | 7/1973 | Dill |
| 3,860,843 A | 1/1975 | Kawasaki |
| 4,144,110 A | 3/1979 | Luc |
| 4,210,865 A | 7/1980 | Nikolaev et al. |
| 4,360,753 A | 11/1982 | Shannon |
| 4,547,678 A | 10/1985 | Metzner et al. |
| 4,556,886 A | 12/1985 | Shimizu et al. |
| 4,609,332 A | 9/1986 | Miki |
| 4,628,499 A | 12/1986 | Hammett |
| 4,659,991 A | 4/1987 | Weischedel |
| 4,689,945 A | 9/1987 | Lattion |
| 4,717,874 A | 1/1988 | Ichikawa et al. |
| 4,737,701 A * | 4/1988 | Hoemann et al. ............ 318/772 |
| 4,774,465 A | 9/1988 | Nilius |
| 4,874,998 A | 10/1989 | Hollis, Jr. |
| 4,904,937 A | 2/1990 | Takahashi et al. |

(Continued)

FOREIGN PATENT DOCUMENTS

| | | |
|---|---|---|
| CN | 1226307 A | 8/1999 |
| CN | 1360536 A | 7/2002 |

(Continued)

OTHER PUBLICATIONS

Halbach Magnetic Rotor Development, Gallo, C.A., NASA Glenn Research Center, Report No. NASA/TM-2008-215056; E-16281, Feb. 2008, p. 27, CASI.

(Continued)

*Primary Examiner* — Kawing Chan
(74) *Attorney, Agent, or Firm* — Perman & Green, LLP; Colin C. Durham

(57) ABSTRACT

A method of commutating a motor includes operatively interfacing a stator and actuated component of the motor, arranging at least two winding sets relative to the actuated component, and independently controlling the at least two winding sets so that with the at least two winding sets the actuated component is both driven and centered.

54 Claims, 8 Drawing Sheets

(56) References Cited

U.S. PATENT DOCUMENTS

| | | | |
|---|---|---|---|
| 4,922,197 A | 5/1990 | Juds | |
| 4,956,945 A | 9/1990 | Ooshima | |
| 4,992,733 A | 2/1991 | Griebeler | |
| 5,003,260 A | 3/1991 | Auchterlonie | |
| 5,015,998 A | 5/1991 | Ellis et al. | |
| 5,092,453 A | 3/1992 | Bruke | |
| 5,105,113 A | 4/1992 | Ishikura | |
| 5,113,102 A | 5/1992 | Gilmor | |
| 5,120,034 A | 6/1992 | Van Engelen | 269/73 |
| 5,124,863 A | 6/1992 | Koizumi et al. | |
| 5,126,610 A | 6/1992 | Fremerey | |
| 5,202,695 A | 4/1993 | Hollandsworth | |
| 5,204,621 A | 4/1993 | Hermann et al. | |
| 5,210,490 A | 5/1993 | Munch et al. | |
| 5,270,600 A | 12/1993 | Hashimoto | |
| 5,285,154 A | 2/1994 | Burreson | |
| 5,324,155 A | 6/1994 | Goodwin | |
| 5,334,892 A | 8/1994 | Chitayat | 310/12 |
| 5,351,004 A | 9/1994 | Daniels et al. | |
| 5,386,738 A | 2/1995 | Havenhill | |
| 5,444,368 A | 8/1995 | Horber | |
| 5,450,009 A | 9/1995 | Murakami | |
| 5,469,053 A | 11/1995 | Laughlin | |
| 5,530,306 A | 6/1996 | Ueyama | |
| 5,532,531 A | 7/1996 | Sakamoto | |
| 5,550,413 A | 8/1996 | Bernus | |
| 5,555,715 A | 9/1996 | Paweletz | |
| 5,568,048 A | 10/1996 | Schroeder et al. | |
| 5,574,364 A | 11/1996 | Kajimoto et al. | |
| 5,589,769 A | 12/1996 | Krahn | |
| 5,606,256 A | 2/1997 | Takei | |
| 5,625,240 A | 4/1997 | Bernus | |
| 5,633,545 A | 5/1997 | Albrecht | |
| 5,641,054 A | 6/1997 | Mori et al. | |
| 5,642,298 A | 6/1997 | Mallory | |
| 5,656,902 A | 8/1997 | Lowrance | |
| 5,670,876 A | 9/1997 | Dilger et al. | |
| 5,741,113 A | 4/1998 | Bacchi | |
| 5,753,991 A | 5/1998 | Couture et al. | |
| 5,801,721 A | 9/1998 | Gandy | |
| 5,808,389 A | 9/1998 | Stephenson | |
| 5,808,437 A * | 9/1998 | Schob | 318/632 |
| 5,813,823 A | 9/1998 | Hofmeister | |
| 5,818,137 A | 10/1998 | Nichols | |
| 5,838,121 A | 11/1998 | Fairbairn | |
| 5,886,432 A | 3/1999 | Markle | 310/12 |
| 5,899,658 A | 5/1999 | Hofmeister | |
| 5,914,548 A | 6/1999 | Watanabe | |
| 5,924,975 A | 7/1999 | Goldowsky | |
| 5,932,947 A | 8/1999 | Kim | |
| 5,955,882 A | 9/1999 | Eisschiel et al. | |
| 5,961,291 A | 10/1999 | Sakagami | |
| 6,015,272 A | 1/2000 | Antaki | |
| 6,018,881 A | 2/2000 | Spies | |
| 6,049,148 A | 4/2000 | Nichols | |
| 6,054,851 A | 4/2000 | Masreliez et al. | |
| 6,058,760 A | 5/2000 | Van Heyningen | |
| 6,074,180 A | 6/2000 | Khanwilkar et al. | |
| 6,078,119 A | 6/2000 | Satoh | |
| 6,086,362 A | 7/2000 | White | |
| 6,096,231 A | 8/2000 | Schertler | |
| 6,097,183 A | 8/2000 | Goetz et al. | |
| 6,100,618 A | 8/2000 | Schoeb | |
| 6,100,681 A | 8/2000 | Tsuruta | |
| 6,127,749 A | 10/2000 | Sogard | 310/12 |
| 6,144,132 A | 11/2000 | Nashiki | |
| 6,147,421 A | 11/2000 | Hazelton | 310/12 |
| 6,158,941 A | 12/2000 | Muka et al. | |
| 6,163,148 A | 12/2000 | Takada et al. | |
| 6,175,174 B1 | 1/2001 | Takahashi | |
| 6,176,668 B1 | 1/2001 | Kurita | |
| 6,189,404 B1 | 2/2001 | Hatake et al. | |
| 6,191,415 B1 | 2/2001 | Stridsberg | |
| 6,206,176 B1 | 3/2001 | Blonigan | |
| 6,208,045 B1 | 3/2001 | Hazelton | |
| 6,227,817 B1 | 5/2001 | Paden | |
| 6,235,172 B1 | 5/2001 | Begin | |
| 6,244,835 B1 | 6/2001 | Antaki | |
| 6,246,233 B1 | 6/2001 | Griffen et al. | |
| 6,249,067 B1 | 6/2001 | Schob et al. | |
| 6,261,247 B1 | 7/2001 | Ishikawa et al. | |
| 6,269,552 B1 | 8/2001 | Honda | |
| 6,285,097 B1 | 9/2001 | Hazelton | 310/12 |
| 6,285,107 B1 | 9/2001 | Sawada | |
| 6,299,404 B1 | 10/2001 | Muka et al. | |
| 6,324,134 B1 | 11/2001 | Ohtachi | |
| 6,326,750 B1 | 12/2001 | Marcinkiewicz | |
| 6,384,500 B1 | 5/2002 | Chassoulier | |
| 6,414,742 B1 | 7/2002 | Korenaga et al. | |
| 6,416,215 B1 | 7/2002 | Terentiev | |
| 6,431,011 B1 | 8/2002 | Feller | |
| 6,445,093 B1 | 9/2002 | Binnard | 310/12 |
| 6,447,265 B1 | 9/2002 | Antaki | |
| 6,447,266 B2 | 9/2002 | Antaki | |
| 6,448,760 B1 | 9/2002 | Neumann et al. | |
| 6,471,459 B2 | 10/2002 | Blonigan | |
| 6,485,250 B2 | 11/2002 | Hofmeister | |
| 6,485,531 B1 | 11/2002 | Schöb | |
| 6,498,411 B2 | 12/2002 | Kanebako | |
| 6,498,451 B1 | 12/2002 | Boules et al. | |
| 6,499,701 B1 | 12/2002 | Thornton et al. | |
| 6,509,732 B1 | 1/2003 | Rhodes et al. | |
| 6,518,747 B2 | 2/2003 | Sager | |
| 6,522,130 B1 | 2/2003 | Lutz | |
| 6,532,791 B2 | 3/2003 | Schmid et al. | |
| 6,537,011 B1 | 3/2003 | Wang | |
| 6,557,957 B2 | 5/2003 | Nagata | |
| 6,559,567 B2 * | 5/2003 | Schob | 310/90.5 |
| 6,559,637 B2 | 5/2003 | Miyata | |
| 6,563,306 B2 | 5/2003 | Sato | |
| 6,573,088 B2 | 6/2003 | Gemmell | |
| 6,580,190 B2 | 6/2003 | Takasu | |
| 6,595,762 B2 | 7/2003 | Khanwilkar et al. | |
| 6,617,739 B1 | 9/2003 | Kinoshita | |
| 6,621,245 B2 | 9/2003 | Vaassen et al. | |
| 6,625,517 B1 | 9/2003 | Bogdanov | |
| 6,629,883 B2 | 10/2003 | Katsuoka et al. | |
| 6,642,711 B2 | 11/2003 | Kawate | |
| 6,646,721 B2 | 11/2003 | Compter et al. | |
| 6,650,079 B2 | 11/2003 | Binnard | |
| 6,661,220 B1 | 12/2003 | Glehr | |
| 6,690,159 B2 | 2/2004 | Burreson et al. | |
| 6,691,074 B1 | 2/2004 | Moriya et al. | |
| 6,698,737 B1 | 3/2004 | Blessing | 269/55 |
| 6,707,200 B2 * | 3/2004 | Carroll et al. | 310/90.5 |
| 6,731,107 B2 | 5/2004 | Reverdy | |
| 6,737,826 B2 | 5/2004 | Gilchrist | |
| 6,781,524 B1 | 8/2004 | Clark | |
| 6,784,580 B2 | 8/2004 | Yashiro | |
| 6,800,833 B2 | 10/2004 | Gregor | |
| 6,803,758 B1 | 10/2004 | Nicholson | |
| 6,809,450 B1 | 10/2004 | Morrison | |
| 6,810,754 B2 | 11/2004 | May | |
| 6,813,543 B2 | 11/2004 | Aalund | |
| 6,838,844 B2 * | 1/2005 | Shimizu et al. | 318/287 |
| 6,853,106 B2 * | 2/2005 | Fujiwara et al. | 310/184 |
| 6,864,955 B2 | 3/2005 | Nishi | |
| 6,876,896 B1 | 4/2005 | Ortiz et al. | |
| 6,877,963 B2 | 4/2005 | Beyer | |
| 6,878,044 B2 | 4/2005 | Sakurai | |
| 6,879,063 B2 | 4/2005 | Frissen | |
| 6,879,126 B2 | 4/2005 | Paden et al. | |
| 6,909,281 B2 | 6/2005 | Grassman et al. | |
| 6,916,231 B2 | 7/2005 | Wakabayashi | |
| 6,917,136 B2 | 7/2005 | Thornton | |
| 6,952,086 B1 | 10/2005 | Krefta | |
| 6,989,647 B1 | 1/2006 | Lee | |
| 6,991,710 B2 | 1/2006 | Harris | |
| 6,995,534 B2 | 2/2006 | Berroth | |
| 7,005,847 B2 | 2/2006 | Grassman et al. | |
| 7,023,118 B1 | 4/2006 | Morrison | |
| 7,030,528 B2 | 4/2006 | Morgante | |
| 7,053,582 B2 | 5/2006 | Ueyama | |
| 7,067,952 B2 | 6/2006 | Neal | |

(56) References Cited

U.S. PATENT DOCUMENTS

| | | |
|---|---|---|
| 7,070,398 B2 | 7/2006 | Olsen |
| 7,087,143 B1 | 8/2006 | Schmidt |
| 7,115,066 B1 | 10/2006 | Lee |
| 7,135,855 B2 | 11/2006 | Nyce |
| 7,164,120 B2 | 1/2007 | Strasser |
| 7,187,143 B2 | 3/2007 | Okada |
| 7,196,604 B2 | 3/2007 | Sills |
| 7,208,945 B2 | 4/2007 | Jones |
| 7,211,918 B2 | 5/2007 | Migita |
| 7,229,258 B2 | 6/2007 | Wood |
| RE39,748 E | 7/2007 | Watanabe |
| 7,246,985 B2 | 7/2007 | Ferrara |
| 7,248,037 B2 | 7/2007 | Hara et al. |
| 7,262,527 B2 | 8/2007 | Neal |
| 7,264,430 B2 | 9/2007 | Bischof |
| 7,292,656 B2 | 11/2007 | Kloper |
| 7,315,164 B2 | 1/2008 | Hata et al. |
| 7,325,559 B2 | 2/2008 | Darut |
| 7,339,370 B2 | 3/2008 | Reimer et al. |
| 7,352,553 B2 | 4/2008 | Kozaki |
| 7,371,306 B2 | 5/2008 | Davis |
| 7,400,141 B2 | 7/2008 | Taniguchi |
| 7,424,830 B2 | 9/2008 | Matsusaki et al. |
| 7,467,930 B2 | 12/2008 | Ozaki |
| 7,518,273 B2 | 4/2009 | Kataoka |
| 7,596,425 B2 | 9/2009 | Asa |
| 7,633,201 B2 | 12/2009 | Buhler |
| 7,897,025 B2 | 3/2011 | Inoue |
| 8,052,504 B2 | 11/2011 | Kalenian |
| 8,104,488 B2 | 1/2012 | Rye |
| 8,129,984 B2 | 3/2012 | Hosek et al. |
| 2001/0036398 A1 | 11/2001 | Hofmeister |
| 2001/0044266 A1 | 11/2001 | Katsuoka et al. |
| 2002/0041168 A1 | 4/2002 | Mann et al. |
| 2002/0060548 A1 | 5/2002 | Iwaji et al. |
| 2002/0089324 A1 | 7/2002 | Miyata et al. |
| 2002/0105241 A1 | 8/2002 | Carroll |
| 2002/0145722 A1 | 10/2002 | Compter ................. 355/75 |
| 2002/0149270 A1 | 10/2002 | Hazelton ................. 310/12 |
| 2002/0153790 A1 | 10/2002 | Kanebako et al. |
| 2003/0011338 A1 | 1/2003 | Gilchrist |
| 2003/0056815 A1 | 3/2003 | Sakai |
| 2003/0085676 A1 | 5/2003 | Binnard ................. 318/114 |
| 2003/0102721 A1 | 6/2003 | Ueta et al. ................. 310/12 |
| 2003/0111912 A1 | 6/2003 | Binnard ................. 310/12 |
| 2003/0183611 A1 | 10/2003 | Gregor |
| 2003/0223853 A1 | 12/2003 | Caveney et al. |
| 2003/0236644 A1 | 12/2003 | Lara et al. |
| 2004/0016891 A1* | 1/2004 | Roes ................. 250/491.1 |
| 2004/0021437 A1 | 2/2004 | Maslov |
| 2004/0056617 A1 | 3/2004 | Berroth |
| 2004/0070300 A1 | 4/2004 | Fu |
| 2004/0072499 A1 | 4/2004 | Wakabayashi |
| 2004/0075426 A1 | 4/2004 | Wakiyama et al. |
| 2004/0124729 A1 | 7/2004 | Long |
| 2004/0151562 A1* | 8/2004 | Hofmeister et al. .......... 414/217 |
| 2004/0217667 A1 | 11/2004 | Popov |
| 2004/0239285 A1* | 12/2004 | Neuvonen ................. 318/717 |
| 2004/0261550 A1 | 12/2004 | Asa |
| 2004/0261944 A1 | 12/2004 | Wakabayashi et al. |
| 2004/0263000 A1 | 12/2004 | Vreugdewater ................. 310/12 |
| 2005/0002743 A1 | 1/2005 | Moriya et al. |
| 2005/0083496 A1 | 4/2005 | Dansberg ................. 355/30 |
| 2005/0151544 A1 | 7/2005 | Mahoney et al. |
| 2005/0184689 A1 | 8/2005 | Maslov |
| 2005/0194843 A1 | 9/2005 | Korenaga ................. 310/12 |
| 2005/0264119 A1 | 12/2005 | Carroll et al. |
| 2005/0265814 A1 | 12/2005 | Coady |
| 2005/0269892 A1 | 12/2005 | Duff |
| 2005/0285550 A1 | 12/2005 | Simons et al. ................. 318/135 |
| 2006/0099063 A1 | 5/2006 | Pietrantonio et al. |
| 2006/0113949 A1 | 6/2006 | Nishimura et al. |
| 2006/0125473 A1 | 6/2006 | Frachon et al. |
| 2006/0131967 A1 | 6/2006 | Lin et al. |
| 2006/0164697 A1 | 7/2006 | Larson |
| 2006/0205553 A1 | 9/2006 | Lee |
| 2006/0219275 A1 | 10/2006 | Weber |
| 2006/0238053 A1 | 10/2006 | Kascak et al. |
| 2006/0244333 A1* | 11/2006 | Jeung ................. 310/186 |
| 2006/0275155 A1 | 12/2006 | Thibodeau |
| 2006/0279149 A1 | 12/2006 | Asper |
| 2007/0020081 A1 | 1/2007 | Gilchrist et al. |
| 2007/0065144 A1 | 3/2007 | Hofmeister et al. |
| 2007/0120556 A1 | 5/2007 | Dufour et al. |
| 2007/0126304 A1 | 6/2007 | Ito et al. |
| 2007/0164697 A1 | 7/2007 | Cox et al. ................. 318/701 |
| 2007/0194787 A1 | 8/2007 | Takahashi et al. |
| 2007/0267920 A1 | 11/2007 | Korenaga ................. 310/12 |
| 2007/0295089 A1 | 12/2007 | Velinsky et al. |
| 2007/0299625 A1 | 12/2007 | Englert et al. |
| 2008/0067968 A1 | 3/2008 | Binnard ................. 318/687 |
| 2008/0116881 A1 | 5/2008 | May |
| 2008/0120164 A1 | 5/2008 | Hassler |
| 2008/0121064 A1 | 5/2008 | Todorov |
| 2009/0243413 A1 | 10/2009 | Gilchrist et al. |
| 2010/0178135 A1 | 7/2010 | Laceky et al. |
| 2011/0025310 A1 | 2/2011 | Moura et al. |

FOREIGN PATENT DOCUMENTS

| | | |
|---|---|---|
| EP | 129731 A1 | 1/1985 |
| EP | 0121084 | 1/1989 |
| EP | 414127 A1 | 2/1991 |
| EP | 526903 A1 | 2/1993 |
| EP | 0565746 | 10/1993 |
| EP | 641061 A2 | 3/1995 |
| EP | 675824 A1 | 10/1995 |
| EP | 758157 A2 | 2/1997 |
| EP | 760244 A1 | 3/1997 |
| EP | 816701 A1 | 1/1998 |
| EP | 0897476 B1 | 2/1999 |
| EP | 1081390 A2 | 8/2000 |
| EP | 1052761 A2 | 11/2000 |
| EP | 1054498 A1 | 11/2000 |
| EP | 1114648 A2 | 7/2001 |
| EP | 1176999 A1 | 2/2002 |
| EP | 1732011 A1 | 12/2006 |
| GB | 1552874 A | 9/1979 |
| GB | 2035622 A | 6/1980 |
| JP | 61152304 | 7/1986 |
| JP | 61152304 A | 7/1986 |
| JP | 1023468 | 1/1989 |
| JP | 1023468 A | 1/1989 |
| JP | 1240268 A | 9/1989 |
| JP | 1240268 A | 9/1989 |
| JP | 0236313 | 2/1990 |
| JP | 3125212 | 3/1990 |
| JP | 02193547 | 7/1990 |
| JP | 3178747 | 8/1991 |
| JP | 3276317 A | 12/1991 |
| JP | 4209996 A | 7/1992 |
| JP | 4308823 A | 10/1992 |
| JP | 04364752 | 12/1992 |
| JP | 5130762 | 5/1993 |
| JP | 5130762 A | 5/1993 |
| JP | 623687 | 2/1994 |
| JP | 0623687 | 2/1994 |
| JP | 6213233 A | 8/1994 |
| JP | 3147568 | 9/1994 |
| JP | 7012091 A | 1/1995 |
| JP | 07255158 | 3/1995 |
| JP | 7131966 | 5/1995 |
| JP | 7131966 A | 5/1995 |
| JP | 07161790 | 6/1995 |
| JP | 07255158 | 10/1995 |
| JP | 8323505 | 12/1996 |
| JP | 8323505 A | 12/1996 |
| JP | 09269007 | 10/1997 |
| JP | 10023781 | 1/1998 |
| JP | 10023781 A | 1/1998 |
| JP | 10070865 | 3/1998 |
| JP | 10316241 | 12/1998 |
| JP | 11030502 A | 2/1999 |
| JP | 11166803 | 6/1999 |

(56) References Cited

FOREIGN PATENT DOCUMENTS

| JP | 2000131006 A | 5/2000 |
|---|---|---|
| JP | 2001074006 A | 3/2001 |
| JP | 2001156150 A | 6/2001 |
| JP | 2001224154 | 8/2001 |
| JP | 2001351874 A | 12/2001 |
| JP | 2002026105 A | 1/2002 |
| JP | 2002511571 A | 4/2002 |
| JP | 2004245703 A | 9/2004 |
| JP | 200368620 A | 10/2004 |
| JP | 4308823 | 11/2004 |
| JP | 2005158826 A | 6/2005 |
| JP | 2005223997 A | 8/2005 |
| JP | 2005223997 A | 8/2005 |
| JP | 2005534176 A | 11/2005 |
| JP | 2006013371 A | 1/2006 |
| JP | 2006014592 | 1/2006 |
| JP | 2006214736 A | 8/2006 |
| JP | 2006014592 | 12/2006 |
| JP | 2007019216 A | 1/2007 |
| JP | 2007024694 A | 2/2007 |
| JP | 2008516457 A | 5/2008 |
| JP | 2008196894 A | 8/2008 |
| JP | 4712379 | 6/2011 |
| TR | 960517 | 7/1996 |
| TW | 304391 | 12/2008 |
| TW | 342898 | 6/2011 |
| WO | WO8912907 A1 | 12/1989 |
| WO | WO9414653 A1 | 7/1994 |
| WO | 9742413 A1 | 11/1997 |
| WO | WO9837335 A1 | 8/1998 |
| WO | 9904481 | 1/1999 |
| WO | 9953266 | 10/1999 |
| WO | WO0102211 A1 | 1/2001 |
| WO | WO0102721 A1 | 1/2001 |
| WO | WO0231372 A1 | 4/2002 |
| WO | WO0241473 A1 | 5/2002 |
| WO | WO03029651 A2 | 4/2003 |
| WO | WO2004098677 A1 | 11/2004 |
| WO | WO2005003565 A1 | 1/2005 |
| WO | WO2005030296 A2 | 4/2005 |
| WO | WO2005114848 A1 | 12/2005 |
| WO | WO2006010285 A1 | 2/2006 |
| WO | WO2006053384 A1 | 5/2006 |
| WO | 2007029623 A1 | 3/2007 |
| WO | 2007068496 | 6/2007 |
| WO | WO2008003943 A2 | 1/2008 |
| WO | 2008039943 A2 | 4/2008 |
| WO | 2009003186 A1 | 12/2008 |

OTHER PUBLICATIONS

Electromagnetic design of a low-fringing-field magnetic bearing stage for electron beam lithography: Special issue on magnetic bearing, Konkola et al., JSME international journal, Series C, Mechanical Systems, 2003, vol. 46, pp. 370-377.
Magnetically levitated planar actuator with moving magnets, Jansen et al., Ieee International Electric Machines and Drives Conference, 2007, pp. 272-278, IEEE.
Analysis and design of synchronous permanent magnet planar motors, Cho et al., Power Engineering Review, Jul. 2002, vol. 22, pp. 52-52, IEEE.
A surface motor-driven planar motion stage integrated with an XY0(z) surface encoder for precision positioning, Goa et al., Precision Engineering Journal of the International Societies for Precision Engineering and Nanotechnology, 2004, vol. 28, pp. 329-337.
Nonlinear Control design for a Magnetic Levitation System, Rafael Becerril Arreola, Thesis for Master of Applied Science, 2003, http://www.control.utoronto.ca/lab/references/Rafael_Becerril_03.pdf.
Analysis and implementation of a tubular motor with Halbach magnetarray, Kim et al., Industry Application Conference, 1996, vol. 1, pp. 471-478, San Diego, CA, IEEE.

Design and analysis of helical motion permanent magnet motor with cylindrical Halbach array, Jang et al., IEEE Transactions, Sep. 2003, vol. 39, pp. 3007-3009.
Desgin of Magnetically levitated 2D drive, Etxaniz et al., COMPEL, 2006, vol. 25, pp. 732-740, Emerald Group Publishing Ltd.
Analysis and Control of 2-DOF Magnetic Levitation Stage Using Force Decoupling Theorem, Park et al., SICE-ICASE, 2006, pp. 1091-1095.
Analysis and comparison of two-dimensional permanent magnet array for planar motor, Duan et al., Magnetics, IEEE Transactions, Nov. 2004, vol. 40, pp. 3490-3494.
Arreola, Rafael Becerril, Output feedback nonlinear control for a linear motor in suspension mode, Automatica, 2004, Elsevier, 2004.
Carpenter, C.J. Electromagnetic induction in terms of Maxwell force instead of magnetic flux, Science, Measurement and Technology, IEE Proceedings, Jul. 1999, vol. 146, Issue 4, pp. 182-193. (abstract) IEEE [online] [retreived on Sep. 8, 2008 (Sep. 8, 20080] Retrieved from the Internet: <URL: http://ieeexplore.Ieee.org/xplifreeabs_all.jsp?tp=&arnum ber-790323&isn u mber-17150>.
Kim et al., Design and Control of a 6-DOF High-Precision Integrated Positioner, Proceeding of the 2004 American Control Conference, Boston, Massachusetts, Jun. 30-Jul. 2, 2004, pp. 2493-2498, 2004, AACC.
Thornton et al., The MangeMotion Maglev System M3, TRB 2003 Annual Meeting CD-ROM, pp. 1-15, 2003.
International Preliminary Report on Patentability dated Dec. 10, 2009; Application PCT/US08/68680.
International Preliminary Report on Patentability dated Jan. 25, 2011; Application PCT/US08/68661.
"A Study of the Rotor Eccentricity Compensation of Bearingless Induction Motor," Zhang et al., Jun. 2004, pp. 148-150, 164 and 201, vol. 8, No. 2, Editorial Board of Electric Machines & Control, China.
"Static Torque Profiles of a Hybrid Stepper Motor Having Eccentricity Between Stator and Rotor Axes," Rajagopal et al., May 15, 2003, pp. 8701-8703, vol. 93, No. 10, A.I.P., Journal of Applied Physics, United States.
"Sinusoidal Shaft Position Encoder," Benarous et al., Mar. 31-Apr. 2, 2004, IEEE Conference Publication 2004, No. 498, pp. 132-136, IEEE International Conference on Power Electronics, Machines and Drives.
"Sine-Cosine Rotation Sensor for 360 Degree Angle Measurement Sensors," Wereb, J.A., 1995, pp. 40-41, vol. 12, No. 11, Elweco, Inc., United States.
"A New CMOS Hall Angular Position Sensor," Technisches Messen, Popovic et al., 2001, pp. 286-291, vol. 68, No. 6, Jun., Swiss Fed. Institute Tech., Lausanne, Switzerland.
"A Novel Multi-DOF Presision Positioning Methodology Using Two-Axis Hall-Effect Sensors," Kawato et al., 2005 American Control Conference, Jun. 8-10, 2005, pp. 3042-3047, IEEE.
"A New Two-Axis Magnetic Position Sensor," Schott et al., 2002, pp. 911-915, IEEE.
"The Long-Range Scanning Stage: A Novel Platform for Scanned-Probe Microscopy," Precision Engineering—Journal of the International Societies for Precision Engineering and Nanotechnology, 2000, pp. 191-209, vol. 24, Elsevier Science, Inc., United States.
International Search Report, PCT/US 08/68160, Sep. 11, 2008, 1 page.
International Preliminary Report on Patentability, PCT/US08/68160, Sep. 11, 2009, 31 pages.
International Search Report, PCT/US 08/68161, Oct. 22, 2008, 1 page.
International Search Report, PCT/US 08/68167, Sep. 11, 2008, 1 page.
International Preliminary Report on Patentability, PCT/US08/68167, Sep. 22, 2009, 8 pages.
International Search Report, PCT/US2008/068670, Sep. 2, 2008, 1 page.
International Search Report, PCT/US2008/068680, Sep. 3, 2008, 2 pages.
International Search Report, PCT/US2008/068682 Sep. 3, 2008, 1 page.

(56) References Cited

OTHER PUBLICATIONS

International Preliminary Report on Patentability, PCT/US08/68682, Aug. 12, 2009, 8 pages.
International Search Report, PCT/US 08/68684 Oct. 19, 2008, 1 page.
International Preliminary Report on Patentability, PCT/US2008/068684, Jan. 5, 2010, 5 pages.
"Electromagnetic induction in terms of the Maxwell force instead of magnetic flux," Science Measurement and Technology, IEEE Proceedings, Jul. 1999, vol. 146, Issue 4, pp. 182-193. (abstract).
Chinese Office Action in CN Application No. 200880104585.4 dated Mar. 7, 2012.
Chinese Office Action in CN Application No. 200880104666.4 dated Aug. 18, 2011.
Chinese Office Action in CN Application No. 200880104585.4 dated Jan. 19, 2011.
Yan, et al, "Coding of Shared Track Grey Encoder," Journal of Dynamic Systems, Measurement, and Control, Sep. 2000, pp. 573-576, vol. 122, ASME.
International Search Report, PCT/US/2008/070346, Oct. 7, 2008.
Taiwan IPO search Report, Application No. 097124040, dated May 19, 2013, 1 page.
Taiwan IPO Search Report, Application No. 097124035, dated Jul. 31, 2013.
Taiwan IPO Search Report, Application No. 097124039 dated Aug. 1, 2013.
Taiwan IPO Search Report, Application No. 097124034 dated Aug. 1, 2013.
Chinese Search Report, Application No. 08801046679 dated Seo. 27, 2012.
International Preliminary Report of Patentability dated Jan. 19, 2010; Application PCT/US08/070346.

* cited by examiner

US 9,752,615 B2

REDUCED-COMPLEXITY SELF-BEARING BRUSHLESS DC MOTOR

This application is related to U.S. patent application Ser. No. 11/769,688, entitled: Commutation of An Electromagnetic Propulsion and Guidance System, filed Jun. 27, 2007.

BACKGROUND

The disclosed embodiments relate to electromagnetic bearings and motors, in particular to a self bearing motor with a reduced number of winding sets.

BRIEF DESCRIPTION OF RELATED DEVELOPMENTS

In certain applications utilizing motors, materials must be processed in a controlled, clean atmosphere where microscopic contaminates may represent a severe problem. In those applications, cleanliness may be directly related to yield, which may in turn affect cost. Other motor applications may include processing steps utilizing hostile atmospheres of highly corrosive gases and high temperatures. Motors with contact bearings may wear, produce particulate contamination, and eventually fail due to the hostile environment. Bearings may also exhibit an unacceptable amount of vibration and play before failing.

U.S. Pat. No. 5,818,137, issued on Oct. 6, 1998 describes an integrated magnetic motoring and suspension system with a stator that has permanent magnets that lift the rotor, eight control windings that stabilize the radial position and tilt orientation of the rotor, and drive windings that actuate the rotor. U.S. Pat. No. 6,707,200, issued on Mar. 16, 2004 describes a rotational magnetic gimbal with an integral magnetic bearing that utilizes four equal length coil segments, each having at least two phases. Torque is applied to each of the coil segments independently (or to groups of coil segments, e.g., as in three-phase motors) to achieve both a desired rotational speed and a desired radial position. U.S. Pat. No. 7,078,839, issued on Jul. 18, 2006 describes a self bearing asymmetrical stepper motor with five coil segments having three phases each. Magnitudes of the currents supplied to the respective coils vary according to a geometric eccentricity of the center of the rotor, and accordingly different magnetic forces are generated from the respective electromagnets. Due to the difference in the magnetic forces, the rotor can be supported and compensation is provided for the geometric deviation.

SUMMARY

The disclosed embodiments are directed to a method of commutating a motor including operatively interfacing a stator and actuated component of the motor, arranging at least two winding sets relative to the actuated component, and independently controlling the at least two winding sets so that with the at least two winding sets the actuator is both driven and centered.

In another embodiment, an apparatus for commutating a motor includes at least two winding sets arranged relative to an actuated component of the motor, and commutation circuitry operable to independently control the at least two winding sets so that with the at least two winding sets the actuated component is both driven and centered.

In still another embodiment a motor includes a stator having at least two independently controlled winding sets, an actuated component operatively interfacing the stator, and a controller communicatively connected to the at least two winding sets for controlling the at least two winding sets to independently drive and center the actuated component, where the at least two winding sets are arranged relative to the actuated component and the controller is programmed to control the at least two winding sets so that with the at least two winding sets the actuated component is both driven and centered.

In other embodiments, a substrate processing apparatus has a motor with a stator having at least two independently controlled winding sets, an actuated component operatively interfacing the stator, and a controller communicatively connected to the at least two winding sets for controlling the at least two winding sets to independently drive and center the actuated component, wherein the at least two winding sets are arranged relative to the actuated component and the controller is programmed to control the at least two winding sets so that with the at least two winding sets the actuated component is both driven and centered.

In other embodiments, a method of commutating a motor includes calculating an adjustment electrical angle, and utilizing the adjustment electrical angle in a common set of commutation equations to independently torque and actively center a rotor of the motor so that the rotor is actively centered with at least two of the motors winding sets.

In another embodiment, a method of commutating a motor includes calculating an adjustment electrical angle and entering the adjustment electrical angle into commutation equations for commutating a motor to independently torque and actively center a rotor of the motor so that the rotor is actively centered with at least two of the motors winding sets.

In another embodiment, an apparatus for commutating a motor includes circuitry for calculating an adjustment electrical angle, and a current amplifier operable to utilize the adjustment electrical angle in a common set of commutation equations so that the common set of commutation equations is capable of producing both torque and active centering forces in motors with at least two winding sets and in motors with at least three winding sets.

In still another embodiment, a motor includes a rotor, and windings driven by a current amplifier, the current amplifier having circuitry for calculating an adjustment electrical angle, and an amplifier operable to utilize the adjustment electrical angle in a common set of commutation equations so that the common set of commutation equations is capable of producing both torque and active centering forces that are different from each other in the motor, where the motor is at least one of a two winding set motor or a three winding set motor.

In yet another embodiment, a substrate processing apparatus includes a controller for commutating a motor including circuitry for calculating an adjustment electrical angle, and a current amplifier operable to utilize the adjustment electrical angle in a common set of commutation equations so that the common set of commutation equations is capable of producing both torque and active centering forces that are different from each other in the motor, wherein the motor is at least one of a two winding set motor or a three winding set motor.

In yet a further embodiment, a substrate processing apparatus includes a motor having a rotor and windings driven by a current amplifier, the current amplifier having circuitry for calculating an adjustment electrical angle, and an amplifier operable to utilize the adjustment electrical angle in a common set of commutation equations so that the common set of commutation equations is capable of producing both torque and active centering forces that are different from each other in the motor, where the motor is at least one of a two winding set motor or a three winding set motor.

BRIEF DESCRIPTION OF THE DRAWINGS

The foregoing aspects and other features of the presently disclosed embodiments are explained in the following description, taken in connection with the accompanying drawings, wherein.

DETAILED DESCRIPTION

Figure 1:
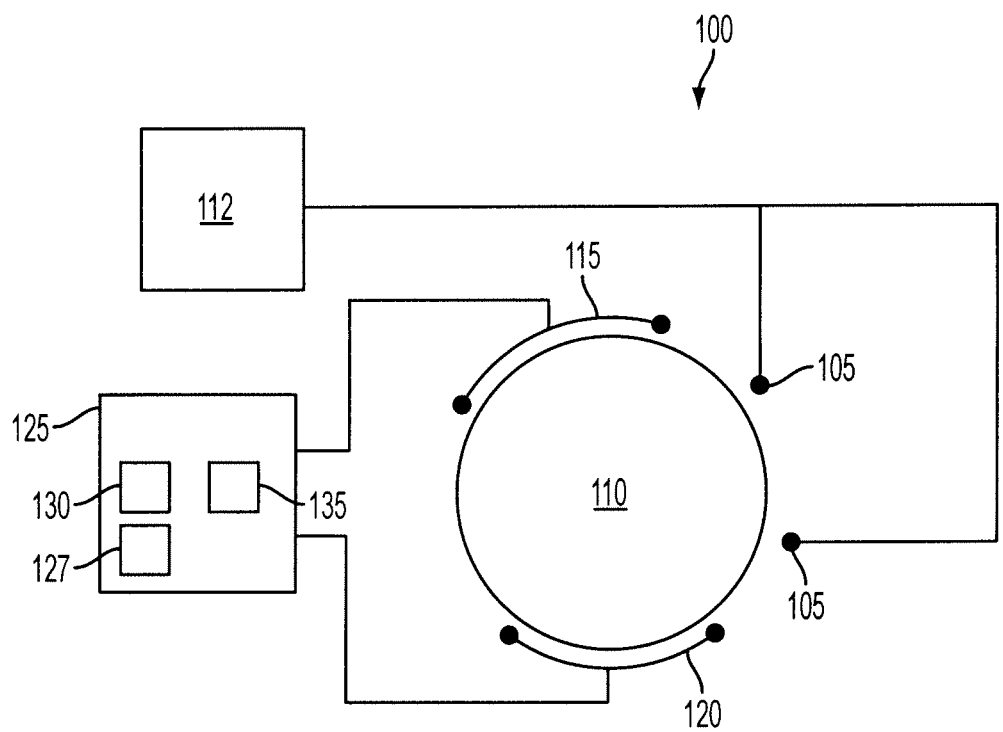
FIG. 1 shows a schematic diagram of an exemplary motor suitable for practicing the disclosed embodiments.

FIG. 1 shows a schematic diagram of an exemplary motor 100 suitable for practicing the embodiments disclosed herein. Although the presently disclosed embodiments will be described with reference to the drawings, it should be understood that they may be embodied in many alternate forms. It should also be understood that any suitable size, shape or type of elements or materials could be used.

Motor 100 includes an actuated component 110, in this embodiment in the form of a rotor, and winding sets 115, 120. For purposes of the disclosed embodiments, it should be understood that the term actuated component includes a device that performs a motion or applies a force in response to forces generated by the winding sets described herein. The rotors and platens of the disclosed embodiments are examples of actuated components.

The embodiment of exemplary motor 100 depicted in FIG. 1 is shown as having a rotary configuration, although other embodiments may include linear configurations as will be described below. Actuated component 110 also referred to as a rotor, may have any suitable construction. Winding sets 115, 120 may include one or more windings and may be driven by current amplifier 125 which may include software, hardware, or a combination of software and hardware suitable for driving the winding sets.

Figure 1A:
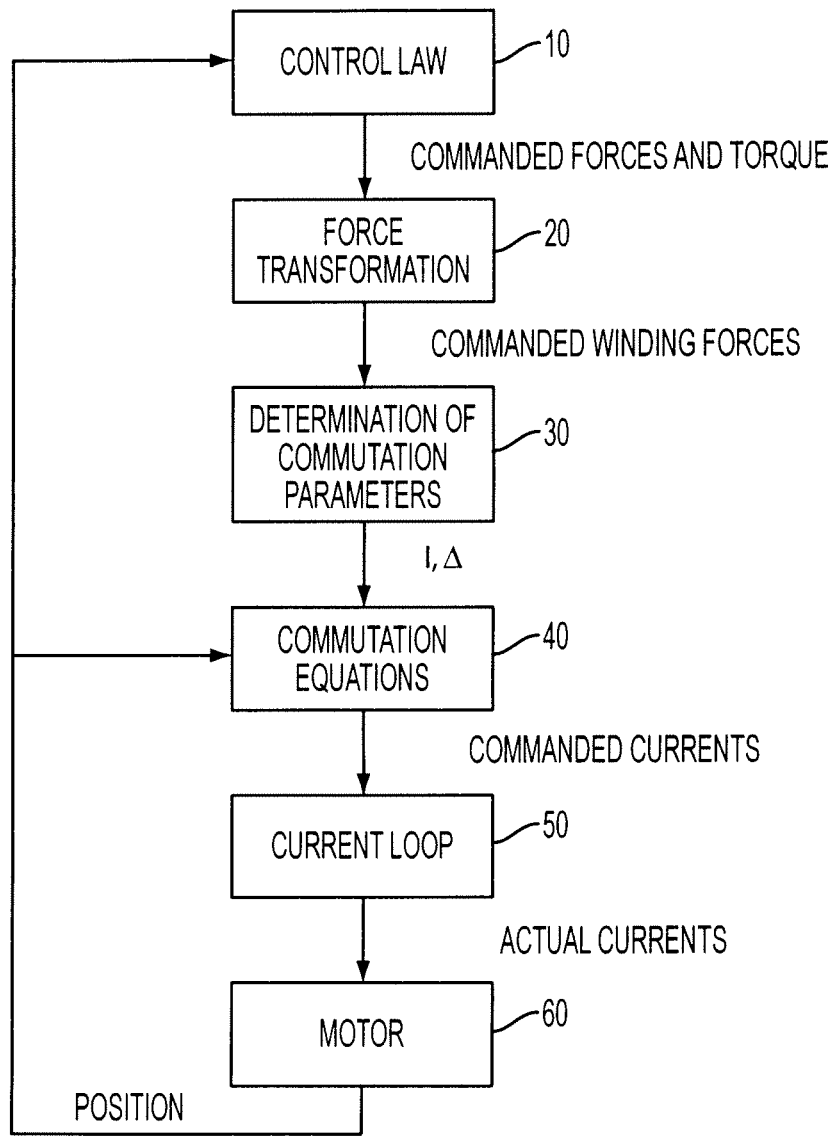
FIG. 1A shows an exemplary flow diagram of the operation of the embodiment of FIG. 1.

FIG. 1A shows an exemplary flow diagram of the operation of the embodiment of FIG. 1. Referring to FIGS. 1 and 1A, in block 10, controller 112 may operate to receive actuated component position information from one or more sensors or sensor systems 105 of motor 100 (block 60). The controller may then determine force and torque commands from the position information and system control laws. In block 20, the controller 112 may then apply one or more force transformation functions to generate a set of commanded winding forces. In block 30, the commanded winding forces may then be used to determine commutation parameters, for example, I and Δ as will be explained below. The controller may then provide the commutation parameters to the current amplifier 125.

The current amplifier 125 may also include a processor 127, a commutation function 130 and a current loop function 135 for driving the winding sets. The processor may generally control and coordinate the operations of commutation and current loop functions. The processor may provide the commutation parameters to the commutation function 130, which as shown in block 40, may determine commanded currents for one or more windings of each winding set according to a set of commutation equations. In block 50, the current loop function 135 may provide actual currents to the motor windings 115, 120. The current loop function may also provide a feedback and driving capability for maintaining the current through the windings as determined. Each current amplifier disclosed herein includes circuitry, hardware or software in any combination as required to perform the functions and computations for the disclosed embodiments.

Figure 2:
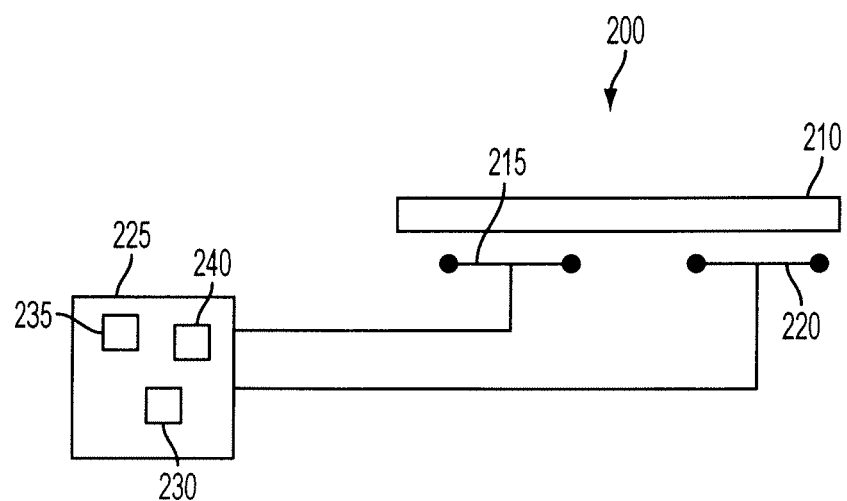
FIG. 2 shows an exemplary motor embodiment having a linear configuration.

FIG. 2 shows another exemplary embodiment having a linear configuration. Motor 200 includes an actuated component 210, in this embodiment having the form of a platen and winding sets 215, 220. Similar to the embodiment of FIG. 1, actuated component 210 may be constructed in any suitable manner and winding sets 215, 220 may include one or more windings. For purposes of the disclosed embodiments, it should be understood that the rotor may be constrained along the axial direction.

It should be understood that individual winding sets 215, 220 may have any suitable orientation. Current amplifier 225 may drive winding sets 215, 225, and may include software, hardware, or any combination of software and hardware suitable for driving the winding sets. A processor 230, a commutation function 235 and a current loop function 240 may be utilized by current amplifier 225 for driving winding sets 215, 225 similar to the embodiment of FIG. 1. The processor 230, commutation function 235, and current loop function 240 may also include circuitry for receiving feedback from one or more sensors or sensor systems that provide position information The disclosed embodiments are directed to a self-bearing motor that advantageously utilizes a minimal number of winding sets to affect the self bearing motor function. For example, one or more embodiments may utilize as few as two of a motor's winding sets to produce the forces required for self bearing. The windings may include any type of winding suitable for use in the disclosed embodiments.

The disclosed embodiments may utilize the same windings to provide substantially decoupled torque forces and radial forces in order to actively control the center of rotation of the actuated component or rotor in the rotary embodiments. In the linear embodiments the same windings may be utilized to provide substantially decoupled linear forces in the direction of motion and guidance forces for actively controlling the platen around a distance across the gap between the stator and the platen. For purposes of the disclosed embodiments linear forces in the direction of motion and torque are referred to collectively as driving forces. For purposes of the disclosed embodiments, the radial forces for actively controlling the center of rotation of the rotor in the rotary embodiments, and the guidance forces across the gap between the stator and the platen are referred to collectively as centering forces.

The disclosed motor embodiments may include segmented windings, for example, winding sets divided into one or more winding subset sets distributed along desired portions of the rotor or platen. Each winding subset set may include one or more windings and may be driven to produce substantially decoupled radial and tangential forces simultaneously for rotary embodiments and to provide substantially decoupled propulsion and guidance forces for linear embodiments. In at least one embodiment, an adjustment electrical angle may be calculated and utilized in a common set of commutation equations to energize the windings. Other commutation implementations may also be utilized. As mentioned above, the actuated components of the embodiments, for example, rotor 110 and platen 210 may be actively centered with as few as two of the motors winding sets (i.e., the rotor 110 and platen 210 may be actively centered with no more than 2 of the motor winding sets). Additional embodiments of the self bearing motor may utilize a novel arrangement of windings and magnetic poles.

Some embodiments of the self-bearing motor may utilize as few as two winding sets and as few as two control channels. One or more commutation functions may be utilized which provide forces along both tangential and radial directions to the actuated component in the form of a rotor, or along motion and guidance directions to the actuated component in the form of a platen. Lorentz and Maxwell type forces may be employed. Optimization techniques may be employed to improve efficiencies in generating driving and centering forces.

A sensor system may be included that provides both position and gap feedback. For example, the sensor system may be configured to provide simultaneous position measurement along a first and second axis. The sensor system may also be capable of providing measurement along a third axis, either simultaneously with the first and second axis measurements or individually. In one or more embodiments, the sensor system may provide all measurements individually, simultaneously or in any combination. In at least one embodiment one axis may extend tangentially to the motor rotor or platen while another axis may be orthogonal to the surface of the rotor or platen.

In further embodiments, position and gap feedback for the motor embodiments are obtained utilizing a limited number of sensors. In at least one embodiment, as few as two pairs of sensors may be used, eliminating the need for multiple numbers of sensor devices. Within each pair, the sensors may be positioned some number of mechanical or electrical degrees apart. Counterpart sensors in the first pair may be positioned a certain number of mechanical or electrical degrees apart from counterpart sensors in additional pairs. In at least one embodiment, two pairs of sensors are used to provide feedback for the disclosed motors.

Applications of the disclosed embodiments may include any suitable motor application, for example, robotics in semiconductor processing. Self-bearing motors as disclosed may also be utilized as replacements for regular bearings. For example, self bearing motors may be advantageously used by drive shafts that control robotic arms. The elimination of contact bearings advantageously reduces particle generation and reducing the number of amplifier channels provides cost savings in hardware implementation.

FIGS. 3, 4, 5, 6, and 7 show additional embodiments of a self-bearing brushless motor as disclosed herein. For simplicity only one phase per motor is shown. The direction of current in the various conductors may be indicated by a dot indicating a direction out of the paper plane and an "x" indicating a direction into the paper plane. Each motor may include a permanent magnet actuated component, for example, rotor 310 having a sequence of alternating poles designated "N" and "S," however, any suitable rotor structure may be utilized.

In the exemplary embodiments, the stators may have an "iron" core (e.g. stator backing made of any suitable material, such as ferromagnetic material), or the motors may have coreless stators. The relationships for desired driving forces torque (T) and centering forces ($F_x$) along the x-axis and ($F_y$) along the y-axis for the embodiments shown in FIGS. 3, 4, 5, 6, and 7 are described herein for motor arrangements utilizing Lorentz forces and for arrangements using a combination of Lorentz and Maxwell forces. The relationships may be utilized to determine appropriate commutation operations for each winding set that will concurrently produce the desired torque T, force $F_x$ and force $F_y$.

In at least one embodiment, the relationships may be utilized to determine appropriate phase current amplitudes ($I_j$, j=A, B, C, . . . ) and electrical angle offsets ($\Delta_j$, j=A, B, C, . . . ) for each winding set that will concurrently produce decoupled torque T and radial forces $F_x$, $F_y$ in the motor. Once determined, the phase current amplitudes ($I_j$, j=A, B, C, . . . ) and electrical angle offsets ($\Delta_j$, j=A, B, C, . . . ) may be used with a common set of commutation functions to produce a desired torque (T) and also desired centering forces ($F_x$) along the x-axis and ($F_y$) along the y-axis.

In some embodiments, the motor may be driven by a 3 phase sinusoidal commutation. In other embodiments, as an alternative to sinusoidal commutation, space vector modulation may be used for wye-configured windings to produce equivalent sine-wave currents through the windings.

Figure 3:
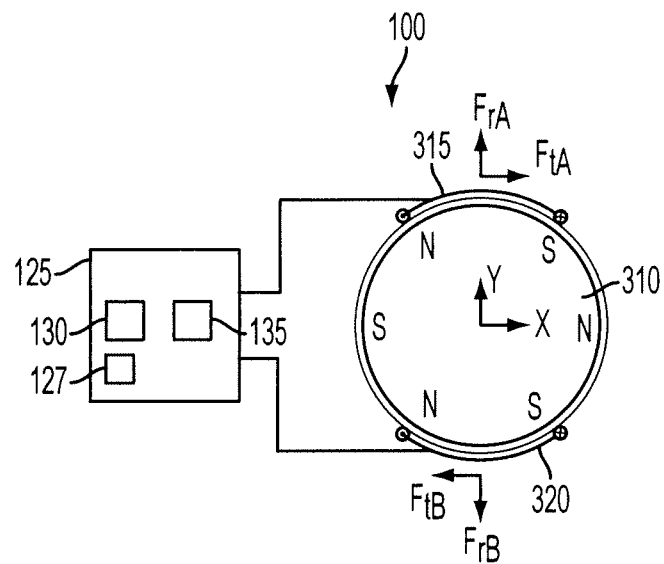
FIG. 3 shows an exemplary motor embodiment with two winding sets offset by about 180 degrees.

Referring to FIG. 3, exemplary relationships for the desired torque (T) and centering forces $F_x$ (along x-axis) and $F_y$ (along y-axis) as a function of the radial and tangential forces $F_{rj}$ and $F_{tj}$ (j=A,B) utilizing Lorentz forces for 2 winding sets, winding set A 315, and winding set B 320 are shown below.

It should be understood that the relationships, calculations and resulting commutation schemes are exemplary and that any suitable commutation solutions may be utilized in the disclosed embodiments to determine decoupled driving and centering forces. While two winding sets are shown it should be understood that the motor may include additional windings or winding sets in addition to those used according to the disclosed embodiments. It should also be understood that any number of winding sets may be utilized to provide the desired decoupled driving and centering forces of the embodiments described herein. While winding sets A 315 and B 320 are shown offset by about 180 degrees it should be understood that other offsets may also be utilized.

As noted before the stator on which the winding sets are disposed may have iron backing (e.g. a cored stator) or the stator may be coreless. Exemplary force relations, for this embodiment of FIG. 3 utilizing Lorentz forces, may be expressed as follows, where R is the radius of the rotor.

$$T = R(F_{tA} + F_{tB}) \tag{1}$$

$$F_x = F_{tA} - F_{tB} \tag{2}$$

$$F_y = F_{rA} - F_{rB} \tag{3}$$

It can be seen that the force relations are expressed as 3 equations and 4 unknowns. An additional equation may be obtained, for example, by finding the minimum of the following cost function.

$$J = F_{rA}^2 + F_{rB}^2 \tag{4}$$

It should be noted that the cost function used above is an example which conveniently distributes the y-direction force equally between the two winding sets, and prevents the different radial forces from interfering with each other. Other cost functions may also be used to solve the problem. For example, another cost function may be utilized that is based on currents drawn by the windings.

The minimization of the cost function above will provide the minimum radial forces subjected to the constraints of (1) to (3):

$$F_{rB} = -\frac{F_y}{2} \quad (5)$$

$$F_{rA} = \frac{F_y}{2} \quad (6)$$

Solving (1) and (2) for $F_{tA}$ and $F_{tB}$:

$$F_{tA} = \frac{1}{2}\left(\frac{T}{R} + F_x\right) \quad (7)$$

$$F_{tB} = \frac{1}{2}\left(\frac{T}{R} - F_x\right) \quad (8)$$

The following force/current relations may be utilized for the embodiment utilizing Lorentz forces of FIG. 3 (assuming 3-phase winding sets):

$$F_{tA} = 1.5 K_t I_A \cos \Delta_A \quad (9)$$

$$F_{rA} = 1.5 K_r I_A \sin \Delta_A \quad (10)$$

$$F_{tB} = 1.5 K_t I_B \cos \Delta_B \quad (11)$$

$$F_{rB} = 1.5 K_r I_B \sin \Delta_B \quad (12)$$

where:
$I_A$=Amplitude of phase current for winding A (A)
$I_B$=Amplitude of phase current for winding B (A)
$\Delta_A$=Electrical angle offset for winding set A (rad)
$\Delta_B$=Electrical angle offset for winding set B (rad)
Using (7) to (12):

$$\Delta_A = a\tan\left(\frac{F_y}{\frac{T}{R} + F_s} \frac{K_t}{K_r}\right) \quad (15)$$

$$\Delta_B = a\tan\left(\frac{F_y}{F_x - \frac{T}{R}} \frac{K_t}{K_r}\right) \quad (16)$$

For purposes of the disclosed embodiments, all arc tangent functions (a tan) described herein may also be interpreted as a four quadrant inverse tangent functions (a tan 2) and the corresponding arguments therefore.

The following exemplary motor commutation equations may be utilized:

$$i_{Aj} = I_A \sin[\theta_A(x,z) - \Delta_A + (2\pi/3)j], j=0,1,2 \quad (17)$$

$$i_{Bj} = I_B \sin[\theta_B(x,z) - \Delta_B + (2\pi/3)j], j=0,1,2 \quad (18)$$

where $I_A$, $\Delta_A$, $I_B$, $\Delta_B$ control magnitudes and orientations of force vectors produced by winding sets A and B, and where:
j=the individual phases of each winding set.

Thus, in the example, by adjusting the electrical angles $\theta_A$ and $\theta_B$ with the electrical angle offsets $\Delta_A$ and $\Delta_B$, a common or standard set of motor commutation equations may be used for producing desired torque (T) and active centering forces ($F_x$) along the x-axis and ($F_y$) along the y-axis utilizing, in this embodiment, only 2 winding sets producing Lorentz forces. Other commutation schemes using any suitable commutation implementation may also be employed.

A suitable exemplary technique utilizing a standard set of commutation equations in this manner may be found in U.S. patent application Ser. No. 11/769,688, entitled: Commutation of An Electromagnetic Propulsion and Guidance System, filed Jun. 27, 2007 which is incorporated by reference herein in its entirety.

Again referring to FIG. 3, the motor arrangement in accordance with another exemplary embodiment may utilize a combination of Lorentz and Maxwell forces. The relationships for the desired torque (T) and centering forces (Fx) along the x-axis and (Fy) along the y-axis as a function of the radial and tangential forces (Frj, Ftj, j=A, B) are the same as shown in Equations (1) to (3). Similar to the embodiments above, it should be understood that the relationships, calculations and resulting commutation schemes are exemplary and that any suitable commutation solutions may be utilized in the disclosed embodiments.

The following force/current relations may be utilized for the embodiment of FIG. 3 utilizing Lorentz and Maxwell forces.

$$F_{tA} = 1.5 K_t I_A \cos \Delta_A \quad (19)$$

$$F_{rA} = 1.5 K_r I_A \sin \Delta_A + 1.5 K_M I_A^2 \quad (20)$$

$$F_{tB} = 1.5 K_t I_B \cos \Delta_B \quad (21)$$

$$F_{rB} = 1.5 K_r I_B \sin \Delta_B + 1.5 K_M I_B^2 \quad (22)$$

The derivation may be separated into two cases, where $F_y>0$ and $F_y<0$ (with respect to the sign convention shown in FIG. 3). These two cases are exemplary. It should be understood that other techniques and force distributions may also be used to determine solutions for $I_A$, $\Delta_A$, $I_B$, $\Delta_B$ while still utilizing a single winding set to produce both tangential and radial forces according to the disclosed embodiments.

For the case where $F_y>0$, make $$\Delta_B = 0 \quad (23)$$

in order, for example, to minimize the Maxwell force associated with winding set B 320 which would otherwise interfere with $F_y$.

For the case where $F_y<0$, make $$\Delta_A = 0 \quad (24)$$

in order, for example, to minimize the Maxwell force associated with winding set A 315 which would otherwise interfere with $F_y$.

Therefore, for the exemplary case where $F_y>0$:

$$I_A = \sqrt{\frac{-b_A + \sqrt{b_A^2 - 4a_A c_A}}{2a_A}} \quad (25)$$

$$I_B = \frac{1}{3K_t}\left(\frac{T}{R} - F_x\right) \quad (26)$$

$$\Delta_A = a\tan\left(\frac{K_t}{K_r}\frac{F_{rA} - 1.5 K_M I_A^2}{F_{tA}}\right) \quad (27)$$

$$\Delta_B = 0 \quad (28)$$

and for the exemplary case where $F_y<0$:

$$I_A = \frac{1}{3K_t}\left(\frac{T}{R} + F_x\right) \tag{29}$$

$$I_B = \sqrt{\frac{-b_B + \sqrt{b_B^2 - 4a_B c_B}}{2a_B}} \tag{30}$$

$$\Delta_A = 0 \tag{31}$$

$$\Delta_B = atan\left(\frac{K_t}{K_r}\frac{F_{rB} - 1.5K_M I_B^2}{F_{tB}}\right) \tag{32}$$

where $a_j$, $b_j$ and $c_j$, $j=A, B$, as a function of T, Fx and Fy are defined in Table 1 below:

TABLE 1

| PARAMETERS | $F_y > 0$ | $F_y < 0$ |
|---|---|---|
| $a_j$ | $a_A = \left(\frac{K_M}{K_r}\right)^2$ | $a_B = \left(\frac{K_M}{K_r}\right)^2$ |
| $b_j$ | $b_A = -\left(\frac{4}{3}F_{rA}\frac{K_M}{K_r^2} + 1\right)^2$ | $b_B = -\left(\frac{4}{3}F_{rB}\frac{K_M}{K_r^2} + 1\right)^2$ |
| $c_j$ | $c_A = \left(\frac{F_{tA}}{1.5K_t}\right)^2 + \left(\frac{F_{rA}}{1.5K_r}\right)^2$ | $c_B = \left(\frac{F_{tB}}{1.5K_t}\right)^2 + \left(\frac{F_{rB}}{1.5K_r}\right)^2$ |
| $F_{tA}$ | $\frac{1}{2}\left(\frac{T}{R} + F_x\right)$ | $\frac{1}{2}\left(\frac{T}{R} + F_x\right)$ |
| $F_{tB}$ | $\frac{1}{2}\left(\frac{T}{R} - F_x\right)$ | $\frac{1}{2}\left(\frac{T}{R} - F_x\right)$ |
| $F_{rA}$ | $F_y + \frac{K_M}{6K_t^2}\left(\frac{T}{R} - F_x\right)^2$ | $\frac{K_M}{6K_t^2}\left(\frac{T}{R} + F_x\right)^2$ |
| $F_{rB}$ | $\frac{K_M}{6K_t^2}\left(\frac{T}{R} - F_x\right)^2$ | $\frac{K_M}{6K_t^2}\left(\frac{T}{R} + F_x\right)^2 - F_y$ |

By applying $I_A$, $\Delta_A$, $I_B$, $\Delta_B$ as derived in the commutation functions 130 to drive winding sets A 315 and B 320, using for example (17) and (18) above, a common set of motor commutation equations may be used to produce desired torque (T) and active centering forces ($F_x$) along the x-axis and ($F_y$) along the y-axis utilizing, in this embodiment, only 2 winding sets producing both Lorentz and Maxwell forces.

Thus, similar to the embodiment above, by adjusting the electrical angles $\theta_A$ and $\theta_B$ with the electrical angle offsets $\Delta_A$ and $\Delta_B$, a common or standard set of motor commutation equations may be used for producing desired torque (T) and active centering forces ($F_x$) along the x-axis and ($F_y$) along the y-axis utilizing, in this embodiment, only 2 winding sets producing Lorentz and Maxwell forces. Other commutation schemes using any suitable commutation implementation may also be utilized.

Figure 4:
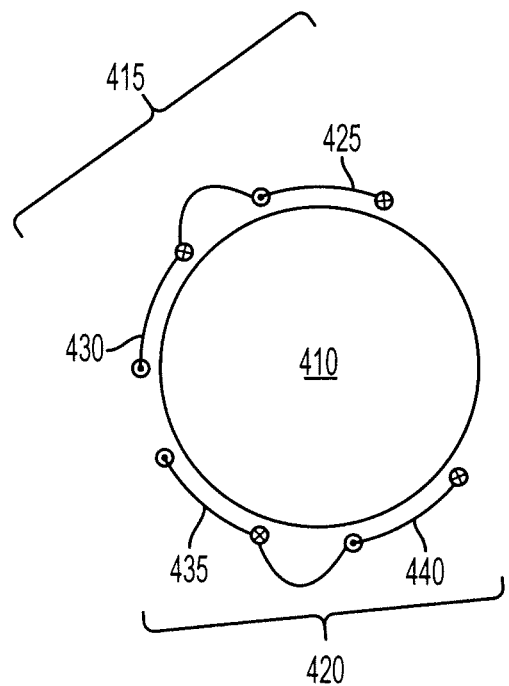
FIG. 4 shows an exemplary embodiment with winding sets distributed on the circumference of the motor.

FIG. 4 shows an exemplary embodiment where the winding sets 415, 420 are distributed at desired locations on the circumference of the rotor 410. Each winding set 415, 420 may be segmented into any number of winding subsets, which may be distributed at any number of desired locations. The winding subsets may be grouped or distributed with any desired electrical or mechanical offset with respect to each other or with respect to the rotor 410. Any number of winding sets and winding subsets and any suitable distribution may be utilized. FIG. 4 shows an exemplary embodiment utilizing two winding sets 415, 420, each arranged as two winding subsets, 425, 430 and 435, 440, respectively. The two winding subsets in each winding set are coupled electrically and shifted with respect to each other by any suitable electrical and mechanical offset.

Figure 5:
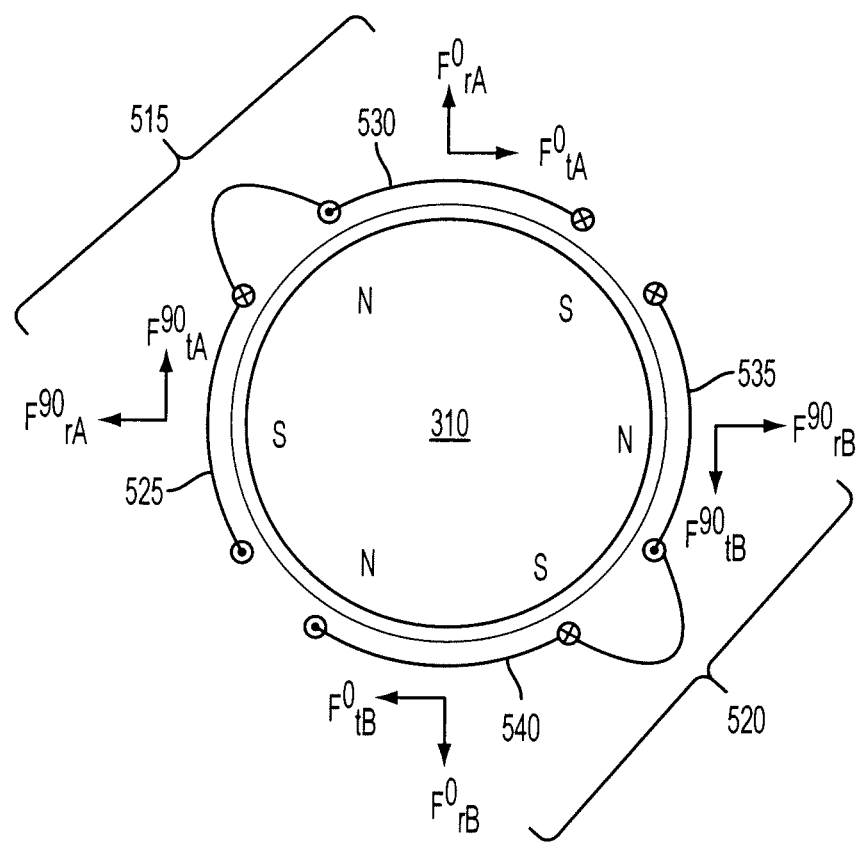
FIG. 5 shows an exemplary embodiment where the winding sets are divided into a number of winding subset sets.

FIG. 5 shows an exemplary embodiment utilizing two winding sets A 515, and B 520, each arranged as two winding subsets, 525, 530 and 535, 540, respectively. The two winding subsets in each winding set are coupled electrically and shifted with respect to each other by about 90 electrical degrees. As a result, when one of the two winding subsets in the pair produces pure tangential force the other winding subset in the pair generates pure radial force, and vice versa. In the exemplary embodiment shown, the segments of each of the respective winding sets may be geometrically arranged at an angle of about 90°. In alternate embodiments the geometric angular offset and the electrical angle offset between winding segments of a respective winding set may be different from each other. In this embodiment, winding set A 515 has two winding subsets $A_0$ 530 and $A_{90}$ 525, and winding set B 520 has two winding subsets $B_0$ 540 and $B_{90}$ 535. Each of the winding sets A and B may be driven by a current amplifier similar to current amplifier 125 of FIG. 1.

Exemplary relationships for the desired torque (T) and centering forces ($F_x$) along the x-axis and ($F_y$) along the y-axis for the segmented winding sets 515, 520 of the embodiment of FIG. 5 utilizing Lorentz forces are as shown below. It should be understood that the relationships, calculations and resulting commutation schemes are exemplary and that any suitable commutation solutions may be utilized in the disclosed embodiments. While two winding sets are shown it should be understood that any number of winding sets may be utilized. Similarly, while four winding subsets are shown it should be understood that any number of winding subsets may be utilized. In addition, while winding subsets 525, 530, 535, 540 are shown offset by 90 degrees it should be understood that other offsets may also be utilized.

The force relations for this embodiment of FIG. 5 may be expressed as follows:

$$T = R(F_{tA}^0 + F_{tB}^{90} + F_{tB}^0 + F_{tA}^{90}) \tag{33}$$

$$F_x = F_{tA}^0 + F_{rA}^{90} - F_{tB}^0 - F_{rB}^{90} \tag{34}$$

$$F_y = F_{rA}^0 + F_{tA}^{90} - F_{rB}^0 - F_{tB}^{90} \tag{35}$$

Note that the following equations hold because within each winding set the winding subsets are offset by 90 electrical degrees.

$$F_{rA}^0 = \beta F_{tA}^{90} \tag{36}$$

$$F_{rA}^{90} = \beta F_{tA}^0 \tag{37}$$

$$F_{rB}^0 = \beta F_{tB}^{90} \tag{38}$$

$$F_{rB}^{90} = \beta F_{tB}^0 \tag{39}$$

$$\beta = K_r/K_t \tag{40}$$

The following force/current relations may be utilized for the embodiment of FIG. 5 utilizing Lorentz forces:

$$F_{tA}^0 = 1.5K_t I_A \cos \Delta_A \tag{41}$$

$$F_{rA}^0 = 1.5K_r I_A \sin \Delta_A \tag{42}$$

$$F_{tB}{}^0 = 1.5 K_t I_B \cos \Delta_B \quad (43)$$

$$F_{rB}{}^0 = 1.5 K_r I_B \sin \Delta_B \quad (44)$$

In order to find a solution for $I_A$, $\Delta_A$, $I_B$, $\Delta_B$ in terms of the radial and tangential forces, it is necessary to add one more equation since there are more variables than equations. There are many ways to solve this problem and different solutions can be obtained depending on the design criteria utilized. As an example, the additional equation is proposed to be obtained by minimizing the cost function below:

$$J = (F_{rA}{}^0)^2 + (F_{rA}{}^{90})^2 + (F_{rB}{}^0)^2 + (F_{rB}{}^{90})^2 \quad (45)$$

From equations (33) to (45) it is possible to arrive at the following solutions:

$$F_{rA}^0 = \frac{\beta}{4R}\left\{T - \frac{R}{\beta+1}[F_x - F_y]\right\} + \frac{\beta}{4(\beta+1)}[F_x + F_y] \quad (46)$$

$$F_{rB}^0 = \frac{\beta}{2R}\left\{T - \frac{R}{\beta+1}[F_x - F_y]\right\} - F_{rA}^0 \quad (47)$$

$$F_{tA}^0 = \frac{F_x}{\beta+1} + \frac{F_{rB}^0}{\beta} \quad (48)$$

$$F_{tB}^0 = \frac{F_{rA}^0}{\beta} - \frac{F_y}{\beta+1} \quad (49)$$

$$I_A = \sqrt{\left(\frac{F_{rA}^0}{1.5 K_r}\right)^2 + \left(\frac{F_{tA}^0}{1.5 K_t}\right)^2} \quad (50)$$

$$I_B = \sqrt{\left(\frac{F_{rB}^0}{1.5 K_r}\right)^2 + \left(\frac{F_{tA}^0}{1.5 K_t}\right)^2} \quad (51)$$

$$\Delta_A = ATAN\left(\frac{F_{rA}^0}{F_{tA}^0} \frac{K_t}{K_r}\right) \quad (52)$$

$$\Delta_B = ATAN\left(\frac{F_{rB}^0}{F_{tB}^0} \frac{K_t}{K_r}\right) \quad (53)$$

By applying the derived $I_A$, $\Delta_A$, $I_B$, $\Delta_B$ in a commutation function, for example 130 (FIG. 1) to drive winding subsets 525, 530 and winding subsets 535, 540, using for example (17) and (18) above, a common set of motor commutation equations may be used for producing desired torque (T) and active centering forces ($F_x$) along the x-axis and ($F_y$) along the y-axis with, in this embodiment, only 2 winding sets producing Lorentz forces.

Thus, similar to the embodiments above, by adjusting the electrical angles $\theta_A$ and $\theta_B$ with the electrical angle offsets $\Delta_A$ and $\Delta_B$, a common or standard set of motor commutation equations may be used for producing desired torque (T) and active centering forces ($F_x$) along the x-axis and ($F_y$) along the y-axis utilizing, in this embodiment, only 2 winding sets producing Lorentz forces. Other commutation schemes using any suitable commutation implementation may also be employed.

Figure 6:
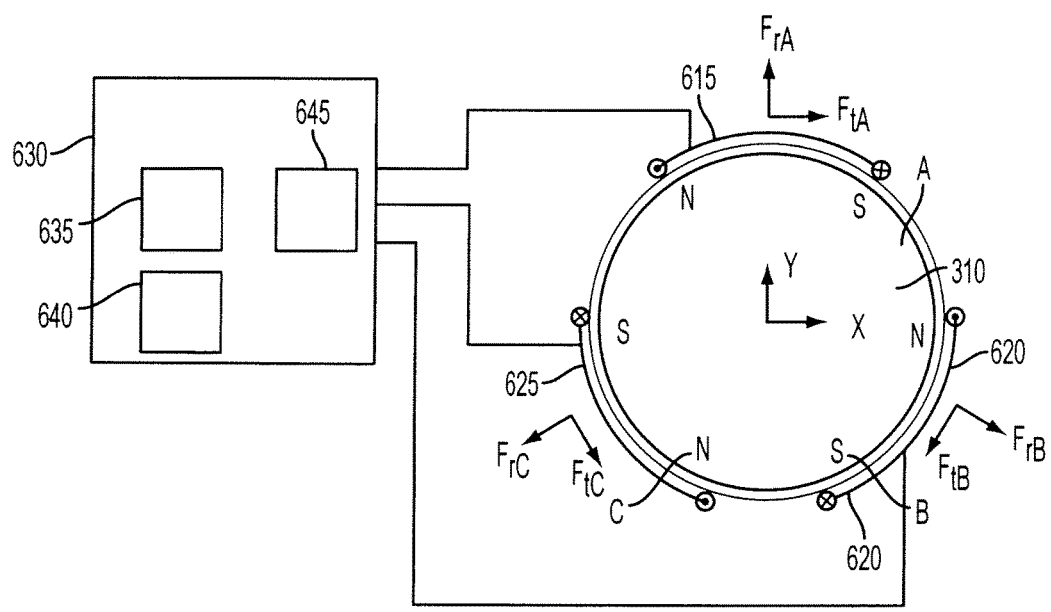
FIG. 6 shows an exemplary embodiment utilizing three winding sets.

FIG. 6 shows an exemplary embodiment utilizing three winding sets A 615, B 620, and C 625 where the winding sets extend over 3 sectors of the rotor, designated A, B, and C as shown. It should be understood that any number of winding sets extending over any number of sectors may be included. Each of the winding sets A 615, B 620, and C 625 may be driven by a current amplifier 630. Current amplifier 630 may include software, hardware, or a combination of software and hardware suitable for driving the winding sets. Current amplifier 630 may also include a processor 635, a commutation function 640, and a current loop function 645 suitable for driving the desired number of winding sets. Similar to current amplifier 125 in FIG. 1, the commutation function 640 may determine current for windings of each winding set according to a set of specified functions, while the current loop function 645 may provide a feedback and driving capability for maintaining the current through the windings as determined. The processor 635, commutation function 640, and current loop function 645 may also include circuitry for receiving feedback from one or more sensors or sensor systems that provide position information.

As has been previously noted, the motor in the exemplary embodiment shown in FIG. 6 may be configured to operate on the basis of Lorentz forces. Referring again to FIG. 6, exemplary relationships for the desired torque (T) and centering forces (Fx) along the x-axis and (Fy) along the y-axis utilizing Lorentz forces may be expressed as shown below. It should be understood that the relationships, calculations and resulting commutation schemes are exemplary and that any suitable commutation solutions may be utilized in the disclosed embodiments. While three winding sets are shown it should be understood that any number of winding sets may be utilized. While winding sets A 615, B 620, and C 625 are shown substantially equally distributed about the stator offset by about 120 degrees it should be understood that other offsets may also be utilized. In other alternate embodiments, the windings may be arranged in a configuration that is generally symmetric about a desired axis but unequally distributed around the stator perimeter.

The force relations for this embodiment of FIG. 6 utilizing Lorentz forces may be expressed for example as follows:

$$T = R[F_{tA} + F_{tB} + F_{tC}] \quad (54)$$

$$F_x = F_{tA} - \frac{1}{2}(F_{tB} + F_{tC}) + \frac{\sqrt{3}}{2}(F_{rB} - F_{rC}) \quad (55)$$

$$F_y = F_{rA} - \frac{\sqrt{3}}{2}(F_{tB} - F_{tC}) - \frac{1}{2}(F_{rB} + F_{rC}) \quad (56)$$

Assume:

$$F_{tA} = F_{tB} = F_{tC} = F_t \quad (57)$$

for the purposes of equally distributing the tangential forces that produce torque among the three winding sets. It should be understood that the equal distribution is an exemplary solution and that other techniques and force distributions may also be used to determine solutions for $I_A$, $\Delta_A$, $I_B$, $\Delta_B$. Other force distributions may be utilized, for example, by introducing a cost function as shown in the embodiments above. For example, a cost function may be utilized based on currents through the windings.

Using (54), (55), (56), and (57):

$$F_t = \frac{T}{3R} \quad (58)$$

$$F_x = \frac{\sqrt{3}}{2}(F_{rB} - F_{rC}) \quad (59)$$

$$F_y = F_{rA} - \frac{1}{2}(F_{rB} + F_{rC}) \quad (60)$$

Similar to the embodiment of FIG. 1, for this embodiment of FIG. 6 there are 2 equations and 3 unknowns. Therefore, one more equation is needed. The additional equation may be obtained by minimizing the following exemplary cost function. As mentioned previously, other cost functions and force distributions may be utilized.

$$J = F_{rA}^2 + F_{rB}^2 + F_{rC}^2 \quad (61)$$

This gives the optimized solution as:

$$F_{rB} = \frac{1}{3}(\sqrt{3}F_x - F_y) \quad (62)$$

$$F_{rA} = \frac{2}{3}F_y \quad (63)$$

$$F_{rC} = -\frac{1}{3}(\sqrt{3}F_x + F_y) \quad (64)$$

The following force/current relations may be utilized for the embodiment utilizing Lorentz forces of FIG. 6:

$$F_{tj} = 1.5 I_j K_t \cos \Delta_j, j = A, B, C \quad (65)$$

$$F_{rj} = 1.5 I_j K_r \sin \Delta_j, j = A, B, C \quad (66)$$

As a result:

$$I_j = \sqrt{\left(\frac{F_{rj}}{1.5K_r}\right)^2 + \left(\frac{F_t}{1.5K_t}\right)^2}, \; j = A, B, C \quad (67)$$

$$\Delta_j = \operatorname{atan}\left[\frac{F_{rj}}{F_t}\frac{K_t}{K_r}\right], \; j = A, B, C \quad (68)$$

where j represents each winding set and:

$$F_t = \frac{T}{3R} \quad (69)$$

$$F_{rA} = \frac{2}{3}F_y \quad (70)$$

$$F_{rB} = \frac{1}{3}(\sqrt{3}F_x - F_y) \quad (71)$$

$$F_{rC} = -\frac{1}{3}(\sqrt{3}F_x + F_y) \quad (72)$$

Similar to the embodiments above, $I_j$ and $\Delta_j$ where j=A, B, C may be applied in commutation function 640, using for example commutation equations in the form of (17) as applicable for winding sets A, B and C, for providing the desired torque T and centering forces Fx, Fy using the three winding sets 615, 620, 625 producing Lorentz forces.

As with the embodiments above, the electrical angle may be adjusted using the electrical angle offset $\Delta_j$ where j=A, B, C in order to provide the desired torque and centering forces using a common set of motor commutation equations. Other commutation schemes using any suitable commutation implementation may also be employed.

Still referring to FIG. 6, the motor in another embodiment may be configured to operate with a combination of Lorentz and Maxwell forces. Exemplary relationships for the desired torque (T) and centering forces ($F_x$) along the x-axis and ($F_y$) along the y-axis as a function of the radial and tangential forces (Frj and Ftj, j=A, B, C) may be similar to the embodiment of FIG. 3 utilizing a combination of Lorentz and Maxwell forces disclosed above.

[In this embodiment, a solution may be obtained based on the location of the desired centering force vector ($F_x$, $F_y$) relative to the three sectors A, B, and C defined for the motor of FIG. 6. For example, each sector may be 120 degrees, and three solutions may be found, one for each sector.

The following force/current relations may be utilized for the embodiment of FIG. 6 utilizing Lorentz and Maxwell forces.

$$F_{tj} = 1.5 I_j K_t \cos \Delta_j, j = A, B, C \quad (73)$$

$$F_{rj} = 1.5 I_j K_r \sin \Delta_j + 1.5 K_M I_j^2, j = A, B, C \quad (74)$$

An example solution for the embodiment of FIG. 6 utilizing Lorentz and Maxwell forces is presented in Table 2 below, where $$a_j = \left(\frac{K_M}{K_r}\right)^2, \; b_j = -\left(\frac{4}{3}F_{rj}\frac{K_M}{K_r^2} + 1\right)^2$$

and $$c_j = \left(\frac{F_{tj}}{1.5K_t}\right)^2 + \left(\frac{F_{rj}}{1.5K_r}\right)^2, \; j = A, B$$

TABLE 2

| PARAMETERS | SECTORS | | |
| --- | --- | --- | --- |
| | AB | BC | CA |
| $I_A$ | $\sqrt{\dfrac{-b_A + \sqrt{b_A^2 - 4a_A c_A}}{2a_A}}$ | $\dfrac{T}{4.5K_t R}$ | $\sqrt{\dfrac{-b_B + \sqrt{b_B^2 - 4a_B c_B}}{2a_B}}$ |
| $I_B$ | $\sqrt{\dfrac{-b_B + \sqrt{b_B^2 - 4a_B c_B}}{2a_B}}$ | $\sqrt{\dfrac{-b_A + \sqrt{b_A^2 - 4a_A c_A}}{2a_A}}$ | $\dfrac{T}{4.5K_t R}$ |
| $I_C$ | $\dfrac{T}{4.5K_t R}$ | $\sqrt{\dfrac{-b_B + \sqrt{b_B^2 - 4a_B c_B}}{2a_B}}$ | $\sqrt{\dfrac{-b_A + \sqrt{b_A^2 - 4a_A c_A}}{2a_A}}$ |
| $\Delta_A$ | $\operatorname{atan}(\lfloor K_t[F_{rA} - 1.5K_M I_A^2]\rfloor/[K_r F_t])$ | 0 | $\operatorname{atan}(K_t[F_{rB} - 1.5K_M I_B^2]/[K_r F_t])$ |
| $\Delta_B$ | $\operatorname{atan}(K_t[F_{rB} - 1.5K_M I_B^2]/[K_r F_t])$ | $\operatorname{atan}(\lfloor K_t[F_{rA} - 1.5K_M I_A^2]\rfloor/[K_r F_t])$ | 0 |

TABLE 2-continued

| PARAMETERS | SECTORS | | |
|---|---|---|---|
| | AB | BC | CA |
| $\Delta_C$ | 0 | $\text{atan}(K_t[F_{rB} - 1.5K_M I_B^2]/[K_r F_{tB}])$ | $\text{atan}([K_t[F_{rA} - 1.5K_M I_A^2]]/[K_r F_{tA}])$ |
| $F_{rA}$ | $F_y + \frac{1}{3}\left[\sqrt{3}F_x + \frac{2K_M}{9}\left(\frac{T}{K_t R}\right)^2\right]$ | $\frac{2}{27}K_M\left(\frac{T}{K_t R}\right)^2$ | $\frac{2}{3}\left[\sqrt{3}F_x + \frac{K_M}{9}\left(\frac{T}{K_t R}\right)^2\right]$ |
| $F_{rB}$ | $\frac{2}{3}\left[\sqrt{3}F_x + \frac{K_M}{9}\left(\frac{T}{K_t R}\right)^2\right]$ | $F_y + \frac{1}{3}\left[\sqrt{3}F_x + \frac{2K_M}{9}\left(\frac{T}{K_t R}\right)^2\right]$ | $\frac{2}{27}K_M\left(\frac{T}{K_t R}\right)^2$ |
| $F_{rC}$ | $\frac{2}{27}K_M\left(\frac{T}{K_t R}\right)^2$ | $\frac{2}{3}\left[\sqrt{3}F_x + \frac{K_M}{9}\left(\frac{T}{K_t R}\right)^2\right]$ | $F_y + \frac{1}{3}\left[\sqrt{3}F_x + \frac{2K_M}{9}\left(\frac{T}{K_t R}\right)^2\right]$ |
| $F_t$ | $\frac{T}{3R}$ | $\frac{T}{3R}$ | $\frac{T}{3R}$ |

Commutation functions for this embodiment may be derived in a manner similar to the embodiments described above. For example, as with the embodiments above, an electrical angle may be adjusted using an electrical angle offset $\Delta_j$, j=A, B, C in order to provide the desired forces using a common set of motor commutation equations, for example, commutation equations in the form of (17) as applicable for winding sets A, B and C. Other commutation schemes using any suitable commutation implementation may also be employed.

Figure 7:
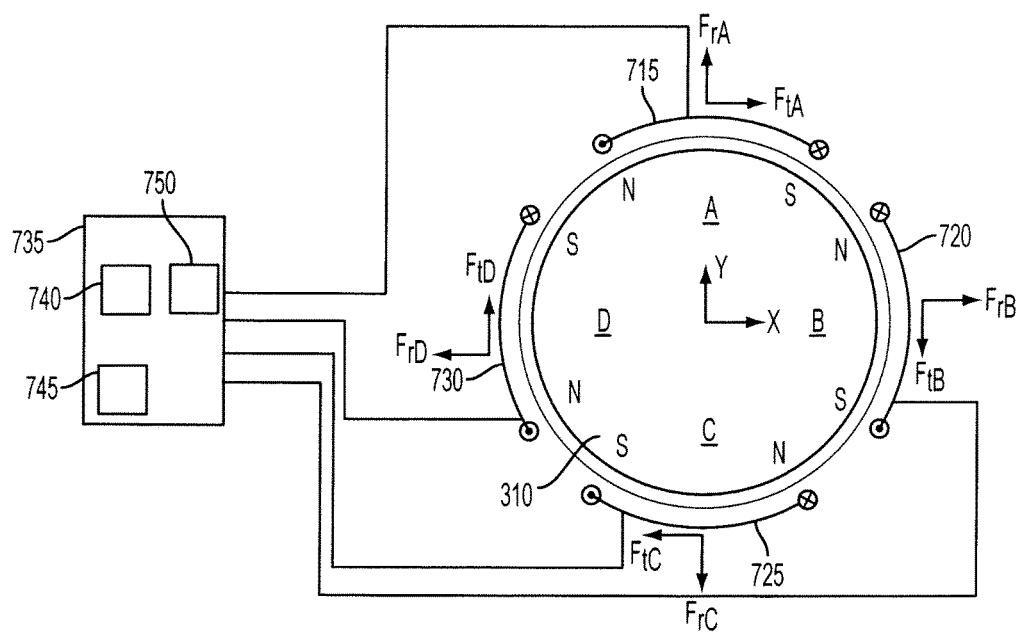
FIG. 7 shows an exemplary embodiment utilizing four winding sets.

FIG. 7 shows an embodiment utilizing four winding sets A 715, B 720, C 725, and D 730 where the winding sets extend over 4 sectors of the rotor, designated A, B, C, and D as shown. Each of the winding sets A 715, B 720, C 725, and D 730 may be driven by a current amplifier 735 capable of driving four winding sets (though shown as evenly distributed around the stator perimeter, in alternate embodiments the winding sets may be arranged in any other desired manner). Current amplifier 735 may include software, hardware, or a combination of software and hardware suitable for driving the winding sets. Current amplifier 735 may also include a processor 740, commutation function 745 and a current loop function 750 suitable for driving four winding sets. Similar to current amplifier 125, the commutation function 745 may determine current for windings of each winding set according to a set of specified functions, while the current loop function 750 may provide a feedback and driving capability for maintaining the current through the windings as determined. The processor 740, commutation function 745, and current loop function 750 may also include circuitry for receiving feedback from one or more sensors or sensor systems that provide position information.

In the exemplary embodiment shown in FIG. 7, the motor may be configured to operate on the basis of Lorentz forces. Exemplary relationships for the desired torque (T) and centering forces ($F_x$) along the x-axis and ($F_y$) along the y-axis utilizing Lorentz forces as a function of radial and tangential forces (Frj and Ftj, j=A, B, C, D) in the embodiment of FIG. 7 are as shown below. Any other relationships, calculations and resulting commutation schemes may also be used.

$$T = R(F_{tA} + F_{tB} + F_{tC} + F_{tD}) \quad (75)$$

$$F_x = F_{tA} + F_{rB} - F_{tC} - F_{rD} \quad (76)$$

$$F_y = F_{rA} + F_{tB} - F_{rC} + F_{tD} \quad (77)$$

Assume:

$$F_{tA} = F_{tB} = F_{tC} = F_{tD} = F_t \quad (78)$$

for the purposes of equally distributing the tangential forces that produce torque among the four winding sets. It should be understood that the equal distribution is an exemplary solution and that other techniques and force distributions may also be used to determine solutions for $I_j$ and $\Delta_j$, j=A, B, C, D. Other force distributions may be utilized, for example, by introducing a cost function as shown in the embodiments above or another exemplary cost function. Another exemplary cost function may be based on currents through the windings.

Therefore:

$$F_t = \frac{T}{4R} \quad (79)$$

$$F_x = F_{rB} - F_{rD} \quad (80)$$

$$F_y = F_{rA} - F_{rC} \quad (81)$$

Assume:

$$F_{rA} = \frac{F_y}{2} \quad (82)$$

$$F_{rC} = -\frac{F_y}{2} \quad (83)$$

$$F_{rB} = \frac{F_x}{2} \quad (84)$$

$$F_{rD} = -\frac{F_x}{2} \quad (85)$$

for the purposes of equally distributing the centering forces between the windings on opposite sides. As mentioned above, it should be understood that the equal distribution is an exemplary solution and that other techniques and force distributions may also be used.

The following force/current relations may be utilized for this embodiment of FIG. 7 utilizing Lorentz forces.

$$F_{tj} = 1.5 I_j K_t \cos \Delta_j, j=A,B,C,D \quad (86)$$

$$F_{rj} = 1.5 I_j K_r \sin \Delta_j, j=A,B,C,D \quad (87)$$

As a result:

$$I_j = \sqrt{\left(\frac{F_{rj}}{1.5K_r}\right)^2 + \left(\frac{F_t}{1.5K_t}\right)^2}, \; j = A, B, C, D \quad (88)$$

$$\Delta_j = a\tan\left[\frac{F_{rj}}{F_t}\frac{K_t}{K_r}\right], \; j = A, B, C, D \quad (89)$$

for each winding set j, j=A 715, B 720, C 725, and D 730, where $$F_r = \frac{T}{4R},$$

$$F_{rA} = \frac{F_y}{2},$$

$$F_{rB} = \frac{F_x}{2},$$

$$F_{rC} = -\frac{F_y}{2} \text{ and } F_{rD} = -\frac{F_x}{2}.$$

$I_j$ and $\Delta_j$, j=A, B, C, D may be applied in commutation function 745 for providing the desired torque T and centering forces Fx, Fy using the 4 winding sets 715, 720, 725, and 430 producing Lorentz forces.

As with the embodiments above, the electrical angle may be adjusted using the electrical angle offset $\Delta_j$, j=A, B, C, D in order to provide the desired torque and centering forces using a common set of motor commutation equations. Thus, the segmented windings A, B, C, D may be driven to produce decoupled torque and centering forces simultaneously to drive and center a rotor of the motor using the adjusted electrical angle in the common set of commutation equations. In addition, any other suitable commutation operations may also be utilized.

Again referring to FIG. 7, the motor in another embodiment may utilize a combination of Lorentz and Maxwell forces. The relationships for the desired torque (T) and centering forces ($F_x$) along the x-axis and ($F_y$) along the y-axis as a function of the radial and tangential forces (Frj and Ftj, j=A, B, C, D) are identical to those of Equations (75) to (81). Similarly to above embodiments utilizing Lorentz and Maxwell forces, a solution may be obtained based on the location of the desired centering force vector (Fx, Fy) relative to four sectors defined for the embodiment of FIG. 7. In this embodiment, each sector may be 90 degrees, and four sets of solutions may be found, one for each sector.

The following force/current relations may be utilized for the embodiment of FIG. 7 utilizing Lorentz and Maxwell forces.

$$F_{rj} = 1.5 I_j K_r \sin \Delta_j + 1.5 K_M I_j^2, j=A,B,C \quad (90)$$

An example solution for the embodiment of FIG. 7 utilizing Lorentz and Maxwell forces is presented in Table 3 below, where, $$a_j = \left(\frac{K_M}{K_r}\right)^2,$$

$$b_j = -\left(\frac{4}{3}F_{rj}\frac{K_M}{K_r^2} + 1\right)^2 \text{ and}$$

$$c_j = \left(\frac{F_{tj}}{1.5K_t}\right)^2 + \left(\frac{F_{rj}}{1.5K_r}\right)^2, \; j = A, B$$

in Table 3.

TABLE 3

| PARAMETERS | SECTORS | | | |
|---|---|---|---|---|
| | AB | BC | CD | DA |
| $I_A$ | $\sqrt{\dfrac{-b_A + \sqrt{b_A^2 - 4a_A c_A}}{2a_A}}$ | $\dfrac{T}{6RK_t}$ | $\dfrac{T}{6RK_t}$ | $\sqrt{\dfrac{-b_B + \sqrt{b_B^2 - 4a_B c_B}}{2a_B}}$ |
| $I_B$ | $\sqrt{\dfrac{-b_B + \sqrt{b_B^2 - 4a_B c_B}}{2a_B}}$ | $\sqrt{\dfrac{-b_A + \sqrt{b_A^2 - 4a_A c_A}}{2a_A}}$ | $\dfrac{T}{6RK_t}$ | $\dfrac{T}{6RK_t}$ |
| $I_C$ | $\dfrac{T}{6RK_t}$ | $\sqrt{\dfrac{-b_B + \sqrt{b_B^2 - 4a_B c_B}}{2a_B}}$ | $\sqrt{\dfrac{-b_A + \sqrt{b_A^2 - 4a_A c_A}}{2a_A}}$ | $\dfrac{T}{6RK_t}$ |
| $I_D$ | $\dfrac{T}{6RK_t}$ | $\dfrac{T}{6RK_t}$ | $\sqrt{\dfrac{-b_B + \sqrt{b_B^2 - 4a_B c_B}}{2a_B}}$ | $\sqrt{\dfrac{-b_A + \sqrt{b_A^2 - 4a_A c_A}}{2a_A}}$ |
| $\Delta_A$ | $\mathrm{atan}(K_t[F_{rA} - 1.5K_M I_A^2]/[K_r F_t])$ | 0 | 0 | $\mathrm{atan}(K_t[F_{rB} - 1.5K_M I_B^2]/[K_r F_t])$ |
| $\Delta_B$ | $\mathrm{atan}(K_t[F_{rB} - 1.5K_M I_B^2]/[K_r F_t])$ | $\mathrm{atan}(K_t[F_{rA} - 1.5K_M I_A^2]/[K_r F_t])$ | 0 | 0 |
| $\Delta_C$ | 0 | $\mathrm{atan}(K_t[F_{rB} - 1.5K_M I_B^2]/[K_r F_t])$ | $\mathrm{atan}(K_t[F_{rA} - 1.5K_M I_A^2]/[K_r F_t])$ | 0 |
| $\Delta_D$ | 0 | 0 | $\mathrm{atan}(K_t[F_{rB} - 1.5K_M I_B^2]/[K_r F_t])$ | $\mathrm{atan}(K_t[F_{rA} - 1.5K_M I_A^2]/[K_r F_t])$ |
| $F_{rA}$ | $F_y + \dfrac{K_M}{24}\left(\dfrac{T}{RK_t}\right)^2$ | $\dfrac{K_M}{24}\left(\dfrac{T}{RK_t}\right)^2$ | $\dfrac{K_M}{24}\left(\dfrac{T}{RK_t}\right)^2$ | $F_x + \dfrac{K_M}{24}\left(\dfrac{T}{RK_t}\right)^2$ |
| $F_{rB}$ | $F_x + \dfrac{K_M}{24}\left(\dfrac{T}{RK_t}\right)^2$ | $F_y + \dfrac{K_M}{24}\left(\dfrac{T}{RK_t}\right)^2$ | $\dfrac{K_M}{24}\left(\dfrac{T}{RK_t}\right)^2$ | $\dfrac{K_M}{24}\left(\dfrac{T}{RK_t}\right)^2$ |

TABLE 3-continued

| PARAMETERS | SECTORS | | | |
|---|---|---|---|---|
| | AB | BC | CD | DA |
| $F_{rC}$ | $\frac{K_M}{24}\left(\frac{T}{RK_t}\right)^2$ | $F_x + \frac{K_M}{24}\left(\frac{T}{RK_t}\right)^2$ | $F_y + \frac{K_M}{24}\left(\frac{T}{RK_t}\right)^2$ | $\frac{K_M}{24}\left(\frac{T}{RK_t}\right)^2$ |
| $F_{rD}$ | $\frac{K_M}{24}\left(\frac{T}{RK_t}\right)^2$ | $\frac{K_M}{24}\left(\frac{T}{RK_t}\right)^2$ | $F_x + \frac{K_M}{24}\left(\frac{T}{RK_t}\right)^2$ | $F_y + \frac{K_M}{24}\left(\frac{T}{RK_t}\right)^2$ |
| $F_t$ | $\frac{T}{4R}$ | $\frac{T}{4R}$ | $\frac{T}{4R}$ | $\frac{T}{4R}$ |

Commutation functions for this embodiment may be derived in a manner similar to the embodiments described above. For example, as with the embodiments above, an electrical angle may be adjusted using an electrical angle offset $\Delta_j$, j=A, B, C, D in order to provide the desired forces using a common set of motor commutation equations, such as commutation equations in the form of (17) as applicable for winding sets A, B, C and D. Other commutation schemes using any suitable commutation implementation may also be employed.

As with the embodiments above, an electrical angle may be adjusted using the electrical angle offset $\Delta_j$, j=A, B, C, D in order to provide the desired forces using a common set of motor commutation equations. Thus, the winding sets A, B, C, D may be driven to produce decoupled torque and centering forces simultaneously to torque and actively center a rotor of the motor using the adjusted electrical angle in the common set of commutation equations.

Figure 8:
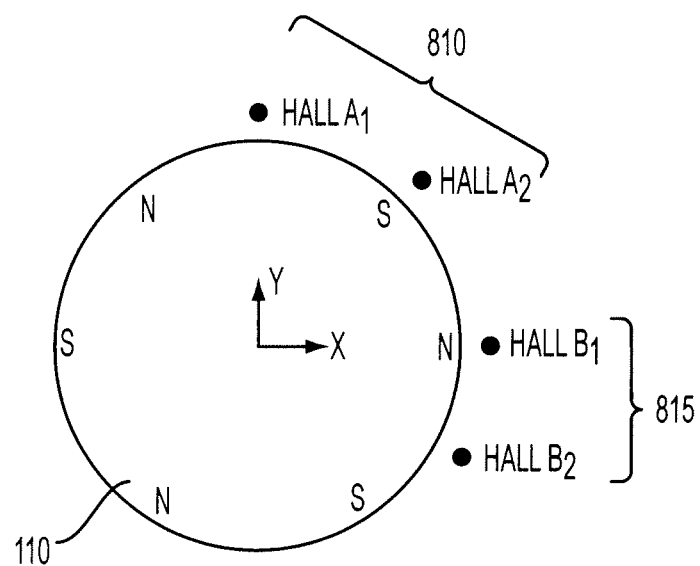
FIG. 8 shows an exemplary embodiment of a sensor system suitable for providing position feedback for the disclosed embodiments.

FIG. 8 shows an exemplary embodiment of a sensor system suitable for providing position feedback for the disclosed embodiments. The sensor system may include a plurality of sensors arranged in pairs. Each sensor pair may be positioned some number of mechanical or electrical degrees apart from another pair. Counterpart sensors in the first pair may be positioned a certain number of mechanical or electrical degrees apart from counterpart sensors in additional pairs.

In the exemplary embodiment of FIG. 8, two pairs of Hall Effect sensors 810, 815 may provide feedback for determining rotor positions for the embodiments above. First pair of Hall Effect sensors 810 may include sensors Hall $A_1$ and Hall $A_2$, while second pair of Hall Effect sensors 815 may include sensors Hall $B_1$ and Hall $B_2$. In this embodiment, the first sensor pair 810 is positioned 90 mechanical degrees offset from second sensor pair 815. Each sensor may also be positioned 90 electrical degrees offset from its pair counterpart. For example, sensor Hall $A_1$ may have a 90 degree electrical offset from sensor Hall $B_1$ and sensor Hall $A_2$ may have a 90 electrical degree offset from sensor Hall $B_2$. Each sensor, Hall $A_1$, Hall $A_2$, Hall $B_1$, and Hall $B_2$ may be connected to the appropriate current amplifier 125, 225, 630, 735 for providing position feedback.

In the exemplary embodiment of FIG. 8 sensors Hall $A_1$ and Hall $A_2$ are also positioned 90 electrical degrees apart from one another, producing phase-shifted position-dependent sinusoidal signals as the rotor rotates. The electrical position of rotor 110 may be computed as:

$$\theta = a\tan(A_1/A_2) \quad (91)$$

where $A_1$ and $A_2$ are the signals from sensors Hall $A_1$ and Hall $A_2$, respectively.

The rotor displacement along the X and Y direction may be computed using both sets of sensors:

$$gap_x = \frac{K_{gX}}{\sqrt[4]{B_1^2 + B_2^2}} \quad (92)$$

$$gap_Y = \frac{K_{gY}}{\sqrt[4]{A_1^2 + A_2^2}} \quad (93)$$

where $A_1$ and $A_2$ are the signals from sensors Hall $A_1$ and Hall $A_2$, respectively, and $B_1$ and $B_2$ are the signals from sensors Hall $B_1$ and Hall $B_2$, respectively, and where the constants $K_{gX}$ and $K_{gY}$ may be, for instance, experimentally determined against known gap references.

Therefore, in this embodiment only two pairs of Hall Effect sensors provide the positional feedback required for the disclosed embodiments. The alternating poles of the rotor may produce a sinusoidal output from each sensor as the rotor rotates. Thus, each pair of sensors 810, 815 produces a phase shifted sine wave output from which the rotor position may be determined. As shown above, an angle determined by the arctangent of the ratio of the two signals of, for example, sensors Hall $A_1$ and Hall $A_2$ may be calculated. In addition, the gap along the x and y axes may be determined by, for example, dividing corresponding constants by the $4^{th}$ root of the sum of the squares of the two sensor signals output by each sensor pair.

Figure 9:
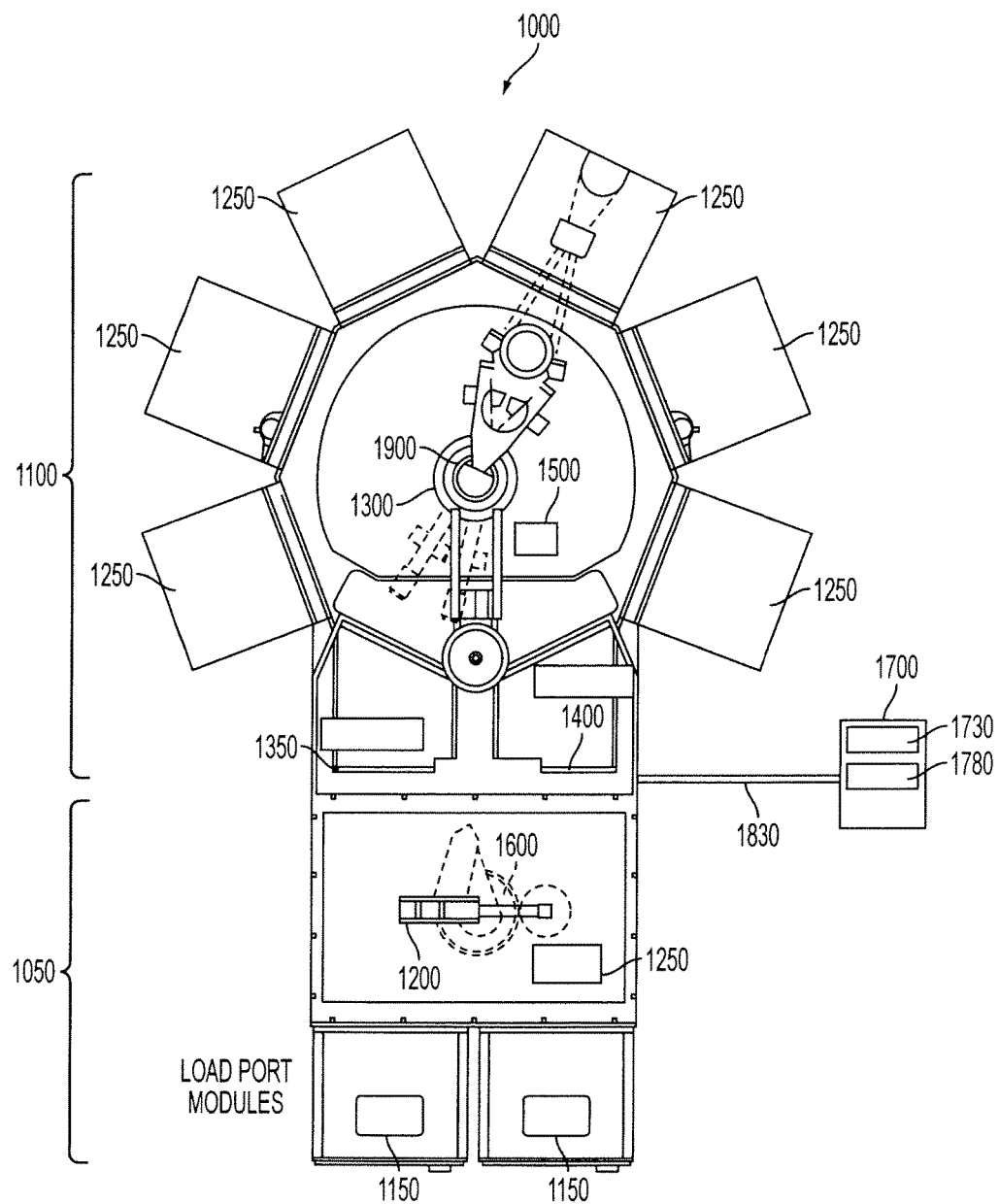
FIG. 9 shows a top view of an exemplary substrate processing apparatus 1000 incorporating features of the disclosed embodiments.

FIG. 9 shows a top view of an exemplary substrate processing apparatus 1000 incorporating features of the disclosed embodiments. Substrate processing apparatus 1001 generally has an atmospheric section 1050, which is open to the atmosphere, and an adjoining vacuum section 1100, which is equipped to function as a vacuum chamber. Atmospheric section 1050 may have one or more substrate holding cassettes 1150, and an atmospheric substrate transport apparatus 1200. Vacuum section 1100 may have one or more processing modules 1250, and a vacuum substrate transport apparatus 1300. The embodiment shown in FIG. 9 may have load locks 1350, 1400 for allowing substrates to pass between atmospheric section 1050 and vacuum section 1100 without violating the integrity of any vacuum that may be present in vacuum section 1100.

Substrate processing apparatus 1000 also includes a controller 1700 that controls the operation of substrate processing apparatus 1000. Controller 1700 may include a processor 1730 and a memory 1780. Controller 1700 may be connected to substrate processing system 1000 through link 1830. For purposes of the disclosed embodiments a substrate may be for example, a semiconductor wafer (e.g. a 200 mm or 300 mm wafer), a flat panel display substrate, any other type of substrate suitable for processing by substrate processing apparatus 1000, a blank substrate, or an article having characteristics similar to a substrate, such as certain dimensions or a particular mass.

Atmospheric substrate transport apparatus 1200 may include one or more self-bearing motors, for example, 1600 according to the disclosed embodiments. Self-bearing motor 1600 may advantageously utilize a minimal number of winding sets to affect the self bearing motor function and may use the same windings to provide substantially decoupled driving and centering forces in accordance with the disclosed embodiments. Self-bearing motor 1600 may be driven by a current amplifier 1250, which may be similar to the current amplifiers described above. Vacuum substrate transport apparatus 1300 may also include one or more self-bearing motors 1900 in accordance with the disclosed embodiments. Self-bearing motor 1900 may be driven by one or more current amplifiers 1500, which are similar to the current amplifiers described above. Substrate processing apparatus 1000 may include other self bearing motors as disclosed herein wherever suitable.

In summary, the disclosed embodiments are directed to a self-bearing motor that advantageously utilizes a minimal number of winding sets to affect the self bearing motor function. Reducing the number of winding sets is advantageous because, for example, associated complex and costly control systems and electronics for controlling independent windings are also reduced. In at least one embodiment as few as two winding sets of a motor may be used to effect the self bearing motor function. In the disclosed exemplary rotary embodiments the same windings may be used to provide substantially decoupled driving and centering forces in order to actively control the center of rotation of the rotor. The same windings may be utilized to provide substantially decoupled propulsion and guidance forces to control a platen in the exemplary linear embodiments. The disclosed motor embodiments may include segmented windings, for example, windings distributed along desired portions of the rotor or platen and divided to form winding sets having one or more winding subsets. In addition, an exemplary sensor system may be included that provides both position and gap feedback. For example, the sensor system may be configured to provide simultaneous position measurement along a first and second axis. The sensor system may also be capable of providing measurement along a third axis, either simultaneously with the first and second axis measurements or individually.

It should be understood that the foregoing description is only illustrative of the present embodiments. Various alternatives and modifications can be devised by those skilled in the art without departing from the embodiments disclosed herein. Accordingly, the embodiments are intended to embrace all such alternatives, modifications and variances which fall within the scope of the appended claims.

What is claimed is:

1. A method of commutating a motor comprising:
   operatively interfacing a stator and actuated component of the motor;
   arranging at least two single circuit winding sets relative to the actuated component; and
   independently controlling each of the at least two single circuit winding sets so that with more than one but no more than two of the at least two single circuit winding sets, driving forces of the actuated component and centering forces of the actuated component are controlled independently of each other, wherein each individual single circuit winding set of the more than one but no more than two single circuit winding sets produces both the driving forces of the actuated component and the centering forces of the actuated component.

2. The method of claim 1, further comprising:
   arranging at least three single circuit winding sets relative to the actuated component; and
   independently controlling the at least three winding sets so that with more than one but no more than two of the at least three winding sets the actuated component is both independently driven and independently centered.

3. The method of claim 1 further comprising:
   arranging each of the at least two single circuit winding sets as a pair of winding subsets; and
   offsetting winding subsets within each pair of winding subsets so that one winding subset of the pair produces a radial force and the other winding subset produces a tangential force on the actuated component.

4. The method of claim 3, comprising offsetting the winding subset within each pair of winding subsets by 90 electrical degrees.

5. An apparatus for commutating a motor comprising:
   at least two single circuit winding sets arranged relative to an actuated component of the motor; and
   commutation circuitry operable to independently control each of the at least two single circuit winding sets so that with more than one but no more than two of the at least two single circuit winding sets the driving forces of the actuated component and the centering forces of the actuated component are controlled independently of each other, wherein each individual single circuit winding set of the more than one but no more than two single circuit winding sets produces both the driving forces of the actuated component and the centering forces of the actuated component.

6. The apparatus of claim 5, further comprising:
   at least three single circuit winding sets arranged relative to the actuated component; and
   commutation circuitry operable to independently control the at least three winding sets so that with more than one but no more than two of the at least three winding sets the actuated component is both independently driven and independently centered.

7. The apparatus of claim 5, wherein:
   each of the at least two single circuit winding sets comprise a pair of winding subsets; and
   winding subsets within each pair of winding subsets are offset so that one winding subset of the pair produces a radial force and the other winding subset produces a tangential force.

8. The apparatus of claim 7, wherein the winding subsets within each pair of winding subsets are offset by 90 electrical degrees.

9. A motor comprising:
   a stator having at least two independently controlled single circuit winding sets;
   an actuated component operatively interfacing the stator; and
   a controller communicatively connected to the at least two single circuit winding sets for controlling each of the at least two single circuit winding sets so that the driving forces of the actuated component and the centering forces of the actuated component are controlled independently of each other,
   wherein the at least two single circuit winding sets are arranged relative to the actuated component and the controller is programmed to control the at least two single circuit winding sets so that with more than one but no more than two of the at least two single circuit winding sets the driving forces of the actuated component and the centering forces of the actuated component are controlled independently of each other, and wherein each individual single circuit winding set of the more than one but no more than two single circuit winding sets produces both the driving forces of the actuated component and the centering forces of the actuated component.

10. The motor of claim 9, wherein:
the stator includes at least three independently controlled single circuit winding set;
the controller is communicatively connected to the at least three winding sets, and
the at least three winding sets are arranged relative to the actuated component and the controller is programmed to control the at least three winding sets so that with more than one but no more than two of the at least three winding sets the actuated component is both independently driven and independently centered.

11. The motor of claim 9, wherein:
each of the at least two independently controlled single circuit winding sets include a pair of winding subsets; and
winding subsets within each pair of winding subsets are offset so that one winding subset of the pair produces a radial force and the other winding subset produces a tangential force.

12. The motor of claim 11, wherein the winding subsets within each pair of winding subsets are offset by 90 electrical degrees.

13. A substrate processing apparatus comprising:
a motor including:
a stator having at least two independently controlled single circuit winding sets;
an actuated component operatively interfacing the stator; and
a controller communicatively connected to each of the at least two single circuit winding sets for controlling the at least two single circuit winding sets so that the driving forces of the actuated component and the centering forces of the actuated component are controlled independently of each other,
wherein the at least two single circuit winding sets are arranged relative to the actuated component and the controller is programmed to control the at least two single circuit winding sets so that with more than one but no more than two of the at least two single circuit winding sets, the driving forces of the actuated component and the centering forces of the actuated component are controlled independently of each other, and wherein each individual single circuit winding set of the more than one but no more than two single circuit winding sets produces both the driving forces of the actuated component and the centering forces of the actuated component.

14. The substrate processing apparatus of claim 13, wherein:
the stator comprises at least three independently controlled single circuit winding sets;
the controller is communicatively connected to the at least three winding sets, and
the at least three winding sets are arranged relative to the actuated component and the controller is programmed to control the at least three winding sets so that with more than one but no more than two of the at least three winding sets the actuated component is both independently driven and independently centered.

15. The substrate processing apparatus of claim 13, wherein:
each of the at least two independently controlled single circuit winding sets include a pair of winding subsets; and
winding subsets within each pair of winding subsets are offset so that one winding subset of the pair produces a radial force and the other winding subset produces a tangential force.

16. The substrate processing apparatus of claim 15, wherein the winding subsets within each pair of winding subsets are offset by 90 electrical degrees.

17. A method of commutating a motor comprising:
calculating an electrical angle offset to produce at least a one dimensional force in a common set of commutation equations; and
applying the electrical angle offset to an electrical angle in the common set of commutation equations such that the electrical angle offset in combination with the electrical angle operate to independently torque and independently center a rotor of the motor so that the rotor is actively centered with more than one but no more than two single circuit motor winding sets, wherein each individual single circuit winding set of the more than one but no more than two single circuit motor winding sets produce both the driving forces of the actuated component and the centering forces of the actuated component.

18. The method of claim 17, further comprising utilizing a winding phase current in combination with the electrical angle offset in the common set of commutation equations.

19. The method of claim 17, further comprising applying the electrical angle offset to the electrical angle in the common set of commutation equations to independently torque and independently center the rotor of the motor so that the rotor is actively centered with more than one but no more than two of at least three motor winding sets.

20. The method of claim 17, further comprising applying the electrical angle offset to the electrical angle in the common set of commutation equations to independently torque and independently center the rotor of the motor so that the rotor is actively centered with more than one but no more than two of at least four motor winding sets.

21. The method of claim 17, further comprising applying the electrical angle offset to the electrical angle in the common set of commutation equations to independently torque and independently center the rotor using Lorentz forces.

22. The method of claim 17, further comprising applying the electrical angle offset to the electrical angle in the common set of commutation equations to independently torque and independently center the rotor using Maxwell forces.

23. The method of claim 17, further comprising applying the electrical angle offset to the electrical angle in the common set of commutation equations to independently torque and independently center the rotor using a combination of Lorentz and Maxwell forces.

24. A method of commutating a motor comprising:
calculating an electrical angle offset to produce at least a one dimensional force in commutation equations for commutating the motor; and
applying the electrical angle offset to an electrical angle in the commutation equations such that the electrical angle offset in combination with the electrical angle operate to independently torque and independently center a rotor of the motor so that the rotor is actively centered with more than one but no more than two single circuit motor winding sets, wherein each individual single circuit winding set of the more than one but no more than two single circuit motor winding sets produces both the driving forces of the actuated component and the centering forces of the actuated component.

25. The method of claim 24, further comprising applying the electrical angle offset to the electrical angle in the commutation equations to independently torque and independently center a rotor of the motor so that the rotor is actively centered with more than one but no more than two of at least three motor winding sets.

26. The method of claim 24, further comprising applying the electrical angle offset to the electrical angle in the commutation equations to independently torque and independently center a rotor of the motor so that the rotor is actively centered with more than one but no more than two of at least four of the motors winding sets.

27. The method of claim 24, further comprising applying the electrical angle offset to the electrical angle so that the independent torque and independent active centering forces in the motor include Lorentz forces.

28. The method of claim 24, further comprising applying the electrical angle offset to the electrical angle so that the independent torque and independent active centering forces in the motor include Maxwell forces.

29. The method of claim 24, further comprising applying the electrical angle offset to the electrical angle so that the independent torque and independent active centering forces in the motor include a combination of Lorentz and Maxwell forces.

30. An apparatus for commutating a motor comprising:
circuitry for calculating an electrical angle offset to produce at least a one dimensional force in a common set of commutation equations; and
a current amplifier operable to apply the electrical angle offset to an electrical angle in the common set of commutation equations such that the electrical angle offset in combination with the electrical angle operate to cause the common set of commutation equations to independently produce torque and independently produce active centering forces using more than one but no more than two single circuit winding sets in motors with at least two winding sets and in motors with at least three winding sets, wherein each individual single circuit winding set of the more than but no more than two single circuit winding seta produces both the driving forces of the actuated component and the centering forces of the actuated component.

31. The apparatus of claim 30, further comprising circuitry for utilizing a winding phase current in combination with the electrical angle offset in the common set of commutation equations.

32. The apparatus of claim 30, wherein the current amplifier is operable to apply the electrical angle offset to the electrical angle in the common set of commutation equations so that the common set of commutation equations is capable of controlling each individual winding set of the more than one but no more than two winding sets so that each individual winding set operates to produce both independent torque and independent active centering forces in motors with at least four winding sets.

33. The apparatus of claim 30, wherein the current amplifier is operable to apply the electrical angle offset to the electrical angle in the common set of commutation equations so that the independent torque and independent active centering forces in the motor include Lorentz forces.

34. The apparatus of claim 30, wherein the current amplifier is operable to apply the electrical angle offset to the electrical angle in the common set of commutation equations so that the independent torque and independent active centering forces in the motor include Maxwell forces.

35. The apparatus of claim 30, wherein the current amplifier is operable to apply the electrical angle offset to the electrical angle in the common set of commutation equations so that the independent torque and independent active centering forces in the motor include a combination of Lorentz and Maxwell forces.

36. A motor comprising:
a rotor; and
windings driven by a current amplifier, the current amplifier having:
circuitry for calculating an electrical angle offset to produce at least a one dimensional force in a common set of commutation equations; and
an amplifier operable to apply the electrical angle offset to an electrical angle in the common set of commutation equations such that the electrical angle offset in combination with the electrical angle operate to cause the common set of commutation equations to independently produce torque and independently produce active centering forces that are different from each other in the motor using more than one but no more than two single circuit winding sets, wherein each individual single circuit winding set of the more than one but no more than two single circuit winding sets produces both the driving forces of the actuated component and the centering forces of the actuated component, and wherein the motor is at least one of a two winding set motor or a three winding set motor.

37. The motor of claim 36, wherein the current amplifier includes circuitry for utilizing a winding phase current in combination with the electrical angle offset in the common set of commutation equations.

38. The motor of claim 36, wherein the amplifier is operable to apply the electrical angle offset to the electrical angle in the common set of commutation equations so that the common set of commutation equations is capable of controlling each individual winding set of the more than one but no more than two winding sets so that each individual winding set operates to produce both independent torque and independent active centering forces that are different from each other in the motor, wherein the motor is at least a four winding set motor.

39. The motor of claim 36, wherein the amplifier is operable to apply the electrical angle offset to the electrical angle in the common set of commutation equations so that the independent torque and independent active centering forces in the motor include Lorentz forces.

40. The motor of claim 36, wherein the amplifier is operable to apply the electrical angle offset to the electrical angle in the common set of commutation equations so that the independent torque and independent active centering forces in the motor include Maxwell forces.

41. The motor of claim 36, wherein the amplifier is operable to apply the electrical angle offset to the electrical angle in the common set of commutation equations so that the independent torque and independent active centering forces in the motor include a combination of Lorentz and Maxwell forces.

42. A substrate processing apparatus comprising:
a controller for commutating a motor including:
circuitry for calculating an electrical angle offset to produce at least a one dimensional force in a common set of commutation equations; and
a current amplifier operable to apply the electrical angle offset to an electrical angle in the common set of commutation equations such that the electrical angle offset in combination with the electrical angle operate to cause the common set of commutation equations to produce both independent torque and independent active centering forces that are different from each other in the motor using more than one but no more than two single circuit winding sets, wherein each individual single circuit winding set of the more than one but no more than two single circuit winding sets produces both the driving forces of the actuated component and the centering forces of the actuated component, and wherein the motor is at least one of a two winding set motor or a three winding set motor.

43. The substrate processing apparatus of claim 42, further comprising circuitry for utilizing a winding phase current in combination with the electrical angle offset in the common set of commutation equations.

44. The substrate processing apparatus of claim 42, wherein the current amplifier is operable to apply the electrical angle offset to an electrical angle in the common set of commutation equations so that the common set of commutation equations is capable of controlling each individual winding set of the more than one but no more than two winding sets so that each individual winding set operates to produce both independent torque and independent active centering forces that are different from each other in the motor, wherein the motor is at least a four winding set motor.

45. The substrate processing apparatus of claim 42, wherein the current amplifier is operable to apply the electrical angle offset to the electrical angle in the common set of commutation equations so that the independent torque and independent active centering forces in the motor include Lorentz forces.

46. The substrate processing apparatus of claim 42, wherein the current amplifier is operable to apply the electrical angle offset to the electrical angle in the common set of commutation equations so that the independent torque and independent active centering forces in the motor include Maxwell forces.

47. The substrate processing apparatus of claim 42, wherein the current amplifier is operable to apply the electrical angle offset to the electrical angle in the common set of commutation equations so that the independent torque and independent active centering forces in the motor include a combination of Lorentz and Maxwell forces.

48. A substrate processing apparatus comprising:
a motor including:
a rotor; and
windings driven by a current amplifier, the current amplifier having:
circuitry for calculating an electrical angle offset to produce at least a one dimensional force in a common set of commutation equations; and
an amplifier operable to apply the electrical angle offset to an electrical angle in the common set of commutation equations such that the electrical angle offset in combination with the electrical angle operate to cause the common set of commutation equations to independently produce torque and independently produce active centering forces that are different from each other in the motor using more than one but no more than two single circuit winding sets, wherein each individual single circuit winding set of the more than one but no more than two single circuit winding sets produces both the driving forces of the actuated component and the centering forces of the actuated component, and wherein the motor is at least one of a two winding set motor or a three winding set motor.

49. The substrate processing apparatus of claim 48, wherein the current amplifier includes circuitry for utilizing a winding phase current in combination with the electrical angle offset in the common set of commutation equations.

50. The substrate processing apparatus of claim 48, wherein the amplifier is operable to apply the electrical angle offset to the electrical angle in the common set of commutation equations so that the common set of commutation equations is capable of controlling each individual winding set of the more than one but no more than two winding sets so that each individual winding set operates to produce both independent torque and independent active centering forces that are different from each other in the motor, wherein the motor is a four winding set motor.

51. The substrate processing apparatus of claim 48, wherein the current amplifier is operable to apply the electrical angle offset to the electrical angle in the common set of commutation equations so that the independent torque and independent active centering forces in the motor include Lorentz forces.

52. The substrate processing apparatus of claim 48, wherein the current amplifier is operable to apply the electrical angle offset to the electrical angle in the common set of commutation equations so that the independent torque and independent active centering forces in the motor include Maxwell forces.

53. The substrate processing apparatus of claim 48, wherein the current amplifier is operable to apply the electrical angle offset to the electrical angle in the common set of commutation equations so that the independent torque and independent active centering forces in the motor include a combination of Lorentz and Maxwell forces.

54. A method of commutating a motor comprising:
operatively interfacing a stator and actuated component of the motor;
arranging at least two single circuit winding sets relative to the actuated component; and
independently controlling each of the at least two single circuit winding sets so that with a minimum of two of the at least two winding sets, driving forces of the actuated component and centering forces of the actuated component are controlled independently of each other, wherein each individual single circuit winding set of the minimum two winding sets produces both the driving forces of the actuated component and the centering forces of the actuated component so that the actuated component is independently driven and independently centered by the minimum two single circuit winding sets.

* * * * *